(12) United States Patent
Saigo et al.

(10) Patent No.: US 8,249,428 B2
(45) Date of Patent: Aug. 21, 2012

(54) CONTENT MANAGEMENT DEVICE AND CONTENT MANAGEMENT METHOD FOR CONTROLLING TRANSFER OF CONTENT HAVING COPY CONTROL INFORMATION

(75) Inventors: Katsuo Saigo, Kobe (JP); Kenjiro Tsuda, Hirakata (JP); Hideyuki Ohgose, Shijyonawate (JP); Hiroaki Shimazaki, Katano (JP)

(73) Assignee: Panasonic Corporation, Osaka (JP)

( * ) Notice: Subject to any disclaimer, the term of this patent is extended or adjusted under 35 U.S.C. 154(b) by 1225 days.

(21) Appl. No.: 11/223,034

(22) Filed: Sep. 12, 2005

(65) Prior Publication Data
US 2006/0115241 A1 Jun. 1, 2006

(30) Foreign Application Priority Data
Nov. 30, 2004 (JP) .................................. 2004-347543

(51) Int. Cl.
H04N 5/93 (2006.01)
H04N 9/80 (2006.01)
(52) U.S. Cl. .................... 386/279; 386/248; 386/252
(58) Field of Classification Search .................. None
See application file for complete search history.

(56) References Cited

U.S. PATENT DOCUMENTS

| 6,571,220 B1 | 5/2003 | Ogino et al. |
| 6,611,534 B1 | 8/2003 | Sogabe et al. |
| 6,697,306 B2 | 2/2004 | Sako |
| 6,937,553 B1 | 8/2005 | Mitui et al. |
| 2001/0010756 A1 | 8/2001 | Ogino |
| 2002/0054755 A1 | 5/2002 | Unno |
| 2002/0131594 A1* | 9/2002 | Hori et al. ................... 380/201 |
| 2002/0159594 A1 | 10/2002 | Kori |
| 2003/0077074 A1* | 4/2003 | Okamoto et al. ............ 386/94 |
| 2003/0231334 A1* | 12/2003 | Nagai et al. ................. 358/1.14 |
| 2004/0073516 A1 | 4/2004 | Yamamichi et al. |
| 2005/0123277 A1* | 6/2005 | Ono et al. ................... 386/94 |
| 2008/0310826 A1* | 12/2008 | Okamoto et al. ............ 386/124 |

FOREIGN PATENT DOCUMENTS

| JP | 2000-004256 A | 1/2000 |
| JP | 2002-251819 A | 9/2002 |
| JP | 2003-006977 | 1/2003 |
| JP | 2003-219326 | 7/2003 |
| JP | 2004-005816 | 1/2004 |

OTHER PUBLICATIONS

Japanese Office Action issued in Japanese Patent Application No. JP 2004-347543, dated Oct. 28, 2008.

* cited by examiner

*Primary Examiner* — William C Vaughn, Jr.
*Assistant Examiner* — Heather Jones
(74) *Attorney, Agent, or Firm* — McDermott Will & Emery LLP

(57) ABSTRACT

The present invention provides a content management device that enables to reproduce a content with original quality even after the content has been converted to have lower quality to be moved, and further enables to notify a user of information regarding the moved content. The content management device includes: a communication unit connected to a communication pathway and configured to output a copy of recorded content received via a communication pathway for storing on an external medium; a content control unit configured to control the output of the recorded content and disable the reproduction of the recorded content when the copy is output; and a content information output unit configured to output externally attribute information comprising at least reproduction status information.

7 Claims, 21 Drawing Sheets

| | 710 | 711 | 712 | 713 | 714 | 715 | 716 | 718 800 | 719 720 | 721 |
|---|---|---|---|---|---|---|---|---|---|---|
| | Content Number | Genre | Title | Recording Date | Recording Period | Recording Size | Format | File Attribute | | Data Cluster Number |
| | | | | | | | | Reproduction | Copy | Move | |
| Example Corresponding to Display | (00101110) | Movie | Is Paris Turning? | 07/24/2002 | 2:10:30 | 17.6GB | HD | Reproduction NG | Copy NG | Moved | (0033~0040 0055~0060) |

FIG. 1

| Copy Control Information (digital_recording_control_data) | Description |
|---|---|
| 00 | Copy-Free |
| 01 | Defined by Content Provider |
| 10 | Copy-One-Generation |
| 11 | Copy-No-More |

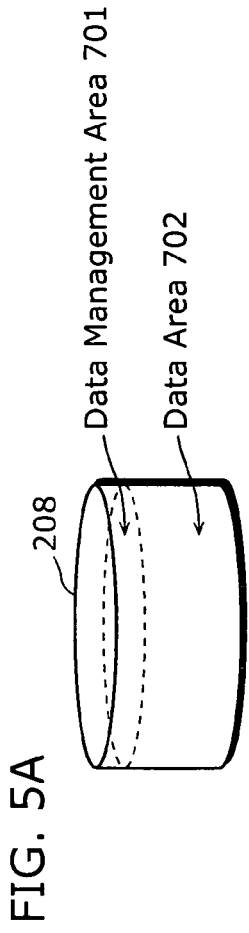
FIG. 5A
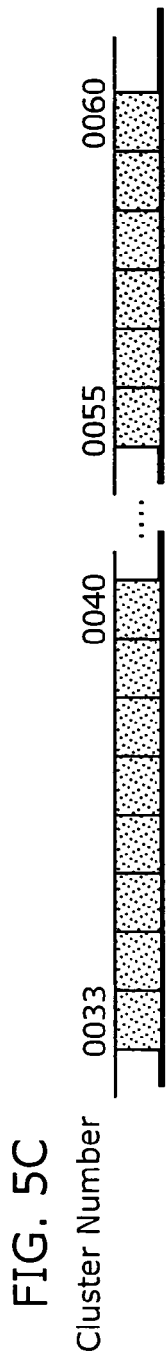
FIG. 5B
FIG. 5C

FIG. 6

| Table Name | PID | Main Descriptor | Information |
|---|---|---|---|
| EIT: Event Information Table | 0x0012 | Short Event Descriptor | for Representing Program Name and Brief Program Information |
| | | Extended Event Descriptor | for Representing Detailed Program Information for Each Item |
| | | Component Descriptor | for Representing Image Quality and Aspect Ratio of Program |
| | | Content Descriptor | for Representing Genre and Specialty of Program |

FIG. 7

| Component Detail | Component Type | Description |
|---|---|---|
| 0x00 | 0x00-0xFF | Reservation for Future Use |
| 0x01 | 0x00 | Reservation for Future Use |
| 0x01 | 0x01 | Image 480i (525i), Aspect Ratio 4:3 |
| 0x01 | 0x02 | Image 480i (525i), Aspect Ratio 16:9, Pan Vector YES |
| 0x01 | 0x03 | Image 480i (525i), Aspect Ratio 16:9, Pan Vector NONE |
| 0x01 | 0x04 | Image 480i (525i), Aspect Ratio >16:9 |
| 0x01 | 0x05-0xA0 | Reservation for Future Use |
| 0x01 | 0xA1 | Image 480p (525p), Aspect Ratio 4:3 |
| 0x01 | 0xA2 | Image 480p (525p), Aspect Ratio 16:9, Pan Vector YES |
| 0x01 | 0xA3 | Image 480p (525i), Aspect Ratio 16:9, Pan Vector NONE |
| 0x01 | 0xA4 | Image 480p (525i), Aspect Ratio >16:9 |
| 0x01 | 0xA5-0xB0 | Reservation for Future Use |
| 0x01 | 0xB1 | Image 1080i (1125i), Aspect Ratio 4:3 |
| 0x01 | 0xB2 | Image 1080i (1125i), Aspect Ratio 16:9, Pan Vector YES |
| 0x01 | 0xB3 | Image 1080i (1125i), Aspect Ratio 16:9, Pan Vector NONE |
| 0x01 | 0xB4 | Image 1080i (1125i), Aspect Ratio >16:9 |
| 0x01 | 0xB5-0xC0 | Reservation for Future Use |
| 0x01 | 0xC1 | Image 720p (750p), Aspect Ratio 4:3 |
| 0x01 | 0xC2 | Image 720p (750p), Aspect Ratio 16:9, Pan Vector YES |
| 0x01 | 0xC3 | Image 720p (750p), Aspect Ratio 16:9, Pan Vector NONE |
| 0x01 | 0xC4 | Image 720p (750p), Aspect Ratio >16:9 |
| 0x01 | 0xC5-0xD0 | Reservation for Future Use |
| 0x01 | 0xD1 | Image 240p, Aspect Ratio 4:3 |
| 0x01 | 0xD2 | Image 240p, Aspect Ratio 16:9, Pan Vector YES |
| 0x01 | 0xD3 | Image 240p, Aspect Ratio 16:9, Pan Vector NONE |
| 0x01 | 0xD4 | Image 240p, Aspect Ratio >16:9 |
| 0x01 | 0xD5-0xFF | Reservation for Future Use |
| 0x02 | 0x00 | Reservation for Future Use |
| 0x02 | 0x01 | Sound, Single Monaural |
| 0x02 | 0x02 | Sound, Dual Monaural |
| 0x02 | 0x03 | Sound, Stereo (Two Channel) |
| 0x02 | 0x04 | Sound, Multisub Multichannel |

FIG. 8

| Genre Classification | Description |
|---|---|
| 0x0 | News |
| 0x1 | Sports |
| 0x2 | Tabloid Show |
| 0x3 | Drama |
| 0x4 | Music |
| 0x5 | Variety Show |
| 0x6 | Movie |
| 0x7 | Cartoon / CG |
| 0x8 | Documentary / Education |
| 0x9 | Theatre / Performance |
| 0xA | Hobby / Culture |
| 0xB | Welfare |
| 0xC-0xD | Suplementary |
| 0xE | Expanded |
| 0xF | Others |

FIG. 10A1
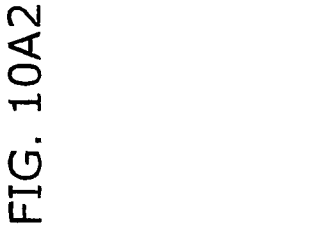
FIG. 10A2
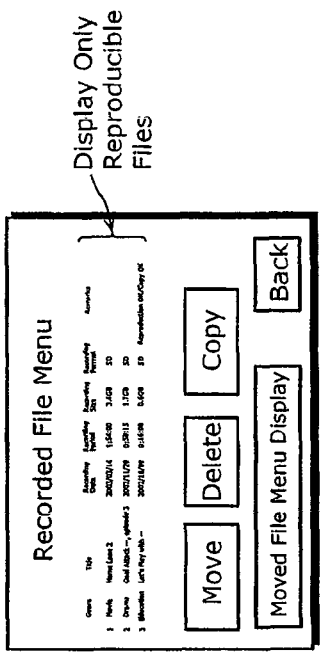
FIG. 10B1
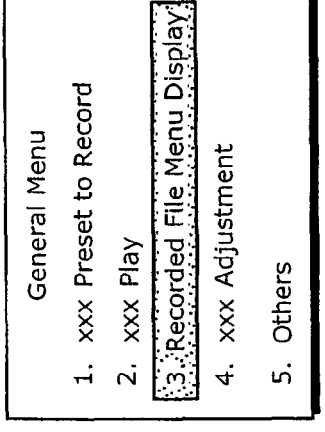
FIG. 10B2
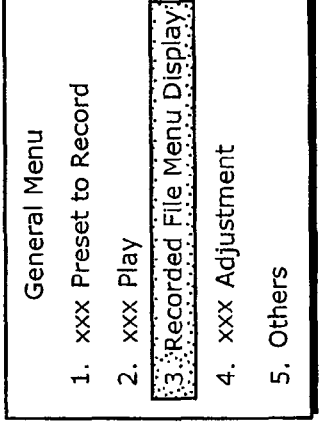
FIG. 10B3
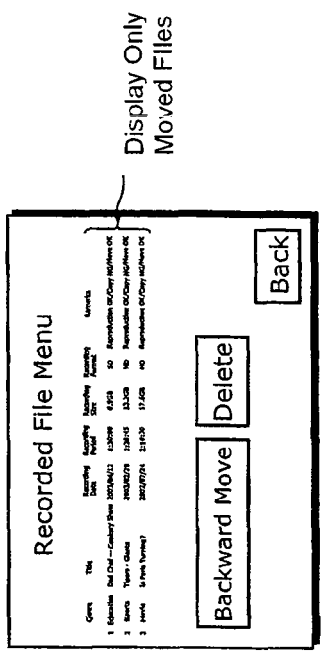
FIG. 10B4
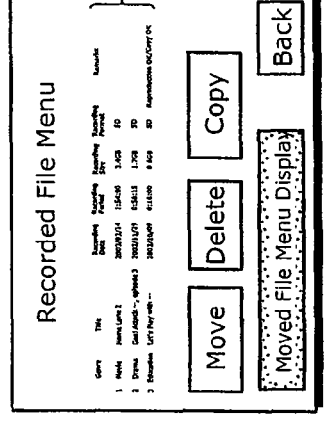

FIG. 11

| | Genre | Title | Recording Date | Recording Period | Recording Size | Recording Format | Remarks |
|---|---|---|---|---|---|---|---|
| 1 | Movie | Is Paris Turning? | 07/24/2002 | 2:10:30 | 17.6GB | HD | Reproduction OK/Copy NG/Move OK |
| 2 | Movie | Home Lone 2 | 03/14/2003 | 1:54:00 | 3.4GB | SD | Reproduction OK/Copy NG/Move OK |
| 3 | Sports | Tigers - Giants | 02/20/2003 | 1:38:45 | 13.2GB | HD | Reproduction OK/Copy NG/Move OK |
| 4 | News | Special Report ··· | 04/04/2003 | 0:15:00 | 0.6GB | SD | Reproduction OK/Copy NG/Move OK |
| 5 | Drama | Goal Attack ···, episode 3 | 11/29/2002 | 0:58:15 | 1.7GB | SD | Reproduction OK/Copy NG/Move OK |
| 6 | Education | Dad Chef ··· Cookery Show | 04/12/2003 | 0:30:00 | 0.9GB | SD | Reproduction OK/Copy NG/Move OK |
| 7 | Education | Let's Play with ··· | 10/09/2002 | 0:16:00 | 0.6GB | SD | Reproduction OK/Copy OK |

[ OK: Possible  NG: Impossible ]

FIG. 12A

| | Genre | Title | Recording Date | Recording Period | Recording Size | Recording Format | Remarks |
|---|---|---|---|---|---|---|---|
| 1 | Movie | Is Paris Turning? | 07/24/2002 | 2:10:30 | 17.6GB | HD | Reproduction OK/Copy NG/Move OK |
| 2 | Movie | Home Lone 2 | 03/14/2003 | 1:54:00 | 3.4GB | SD | Reproduction OK/Copy NG/Move OK |
| 3 | Sports | Tigers - Giants | 02/20/2003 | 1:38:45 | 13.2GB | HD | Reproduction OK/Copy NG/Move OK |
| 4 | News | Special Report ··· | 04/04/2003 | 0:15:00 | 0.6GB | SD | Reproduction OK/Copy NG/Move OK |
| 5 | Drama | Goal Attack ···, episode 3 | 11/29/2002 | 0:58:15 | 1.7GB | SD | Reproduction OK/Copy NG/Move OK |
| 6 | Education | Dad Chef ··· Cookery Show | 04/12/2003 | 0:30:00 | 0.9GB | SD | Reproduction OK/Copy NG/Move OK |
| 7 | Education | Let's Play with ··· | 10/09/2002 | 0:16:00 | 0.6GB | SD | Reproduction OK/Copy OK |

Move with Conversion → (columns 1, 3)
General Move → (column 6)

FIG. 12B

| | Genre | Title | Recording Date | Recording Period | Recording Size | Recording Format | Remarks |
|---|---|---|---|---|---|---|---|
| 1 | Movie | Is Paris Turning? | 07/24/2002 | 2:10:30 | 17.6GB | HD | Reproduction NG/Copy NG/Moved |
| 2 | Movie | Home Lone 2 | 03/14/2003 | 1:54:00 | 3.4GB | SD | Reproduction OK/Copy NG/Move OK |
| 3 | Sports | Tigers - Giants | 02/20/2003 | 1:38:45 | 13.2GB | HD | Reproduction Partly NG/Copy NG/Moved Partly |
| 4 | Drama | Goal Attack ···, episode 3 | 11/29/2002 | 0:58:15 | 1.7GB | SD | Reproduction OK/Copy NG/Move OK |
| 5 | Education | Dad Chef ··· Cookery Show | 04/12/2003 | 0:30:00 | 0.9GB | SD | Reproduction NG/Copy NG/Moved |
| 6 | Education | Let's Play with ··· | 10/09/2002 | 0:16:00 | 0.6GB | SD | Reproduction OK/Copy OK |

(OK: Possible  NG: Impossible)

FIG. 13A

| | Genre | Title | Recording Date | Recording Period | Recording Size | Recording Format | Remarks |
|---|---|---|---|---|---|---|---|
| 1 | Movie | Home Lone 2 | 03/14/2003 | 1:54:00 | 3.4GB | SD | Reproduction OK/Copy NG/Move OK |
| 2 | Drama | Goal Attack ···, episode 3 | 11/29/2002 | 0:58:15 | 1.7GB | SD | Reproduction OK/Copy NG/Move OK |
| 3 | Sports | Tigers - Giants | 02/20/2003 | 1:38:45 | 13.2GB | HD | Reproduction Partly NG/Copy NG/Moved Partly |
| 4 | Education | Let's Play with ··· | 10/09/2002 | 0:16:00 | 0.6GB | SD | Reproduction OK/Copy OK |

FIG. 13B

| | Genre | Title | Recording Date | Recording Period | Recording Size | Recording Format | Remarks |
|---|---|---|---|---|---|---|---|
| 1 | Movie | Is Paris Turning? | 07/24/2002 | 2:10:30 | 17.6GB | HD | Reproduction NG/Copy NG/Moved Partly |
| 2 | Sports | Tigers - Giants | 02/20/2003 | 1:38:45 | 13.2GB | HD | Reproduction Partly NG/Copy NG/Moved Partly |
| 3 | Education | Dad Chef ··· Cookery Show | 04/12/2003 | 0:30:00 | 0.9GB | SD | Reproduction NG/Copy NG/Moved |

[ OK: Possible  NG: Impossible]

FIG. 14A

| | Genre | Title | Recording Date | Recording Period | Recording Size | Recording Format | Remarks |
|---|---|---|---|---|---|---|---|
| 1 | Movie | Is Paris Turning? | 07/24/2002 | 2:10:30 | 17.6GB | HD | Reproduction NG/Copy NG/Moved |
| 2 | Movie | Home Lone 2 | 03/14/2003 | 1:54:00 | 3.4GB | SD | Reproduction OK/Copy NG/Move OK |
| 3 | Sports | Tigers - Giants | 02/20/2003 | 1:38:45 | 13.2GB | HD | Reproduction Partly NG/Copy NG/Moved Partly |
| 4 | Drama | Goal Attack ···, episode 3 | 11/29/2002 | 0:58:15 | 1.7GB | SD | Reproduction OK/Copy NG/Move OK |
| 5 | Education | Dad Chef ··· Cookery Show | 04/12/2003 | 0:30:00 | 0.9GB | SD | Reproduction NG/Copy NG/Moved — Backward Move |
| 6 | Education | Let's Play with ··· | 10/09/2002 | 0:16:00 | 0.6GB | SD | Reproduction OK/Copy OK |

FIG. 14B

| | Genre | Title | Recording Date | Recording Period | Recording Size | Recording Format | Remarks |
|---|---|---|---|---|---|---|---|
| 1 | Movie | Is Paris Turning? | 07/24/2002 | 2:10:30 | 17.6GB | HD | Reproduction NG/Copy NG/Moved |
| 2 | Movie | Home Lone 2 | 03/14/2003 | 1:54:00 | 3.4GB | SD | Reproduction OK/Copy NG/Move OK |
| 3 | Sports | Tigers - Giants | 02/20/2003 | 1:38:45 | 13.2GB | HD | Reproduction Partly NG/Copy NG/Moved Partly |
| 4 | Drama | Goal Attack ···, episode 3 | 11/29/2002 | 0:58:15 | 1.7GB | SD | Reproduction OK/Copy NG/Move OK |
| 5 | Education | Dad Chef ··· Cookery Show | 04/12/2003 | 0:30:00 | 0.9GB | SD | Reproduction OK/Copy NG/Move OK |
| 6 | Education | Let's Play with ··· | 10/09/2002 | 0:16:00 | 0.6GB | SD | Reproduction OK/Copy OK |

[OK: Possible  NG: Impossible]

FIG. 15A

| | Genre | Title | Recording Date | Recording Period | Recording Size | | Remarks |
|---|---|---|---|---|---|---|---|
| 1 | Movie | Is Paris Turning? | 07/24/2002 | 2:10:30 | 17.6GB | HD | Reproduction NG/Copy NG/Moved |
| 2 | Movie | Home Lone 2 | 03/14/2003 | 1:54:00 | 3.4GB | SD | Reproduction OK/Copy NG/Move OK |
| 3 | Sports | Tigers - Giants | 02/20/2003 | 1:38:45 | 13.2GB | HD | Reproduction Partly NG/Copy NG/Moved Partly |
| 4 | Drama | Goal Attack ···, episode 3 | 11/29/2002 | 0:58:15 | 1.7GB | SD | Reproduction OK/Copy NG/Move OK |
| 5 | Education | Dad Chef ··· Cookery Show | 04/12/2003 | 0:30:00 | 0.9GB | SD | Reproduction NG/Copy NG/Moved |
| 6 | Education | Let's Play with ··· | 10/09/2002 | 0:16:00 | 0.6GB | SD | Reproduction OK/Copy OK |

Delete

FIG. 15B

| | Genre | Title | Recording Date | Recording Period | Recording Size | | Remarks |
|---|---|---|---|---|---|---|---|
| 1 | Movie | Home Lone 2 | 03/14/2003 | 1:54:00 | 3.4GB | SD | Reproduction OK/Copy NG/Move OK |
| 2 | Drama | Goal Attack ···, episode 3 | 11/29/2002 | 0:58:15 | 1.7GB | SD | Reproduction OK/Copy NG/Move OK |
| 3 | Education | Dad Chef ··· Cookery Show | 04/12/2003 | 0:30:00 | 0.9GB | SD | Reproduction NG/Copy NG/Moved |
| 4 | Education | Let's Play with ··· | 10/09/2002 | 0:16:00 | 0.6GB | SD | Reproduction OK/Copy OK |

[OK: Possible  NG: Impossible]

CONTENT MANAGEMENT DEVICE AND CONTENT MANAGEMENT METHOD FOR CONTROLLING TRANSFER OF CONTENT HAVING COPY CONTROL INFORMATION

BACKGROUND OF THE INVENTION (1) Field of the Invention

The present invention relates to management of content data and a method for the management, in which a content having copy control information is moved, namely transferred.

(2) Description of the Related Art

Currently, in the field of broadcast satellite (BS) digital broadcasting and terrestrial digital broadcasting, aiming to protect copyrights of broadcast contents, broadcast waves even for free broadcasting are scrambled to implement, in principle, a copy control of "copy-one-generation" for the broadcast contents.

A signal for the copy control is multiplexed together with compressed content data, such as image data and audio data, in order to be sent as a transmission control signal. The transmission control signal has a program map table (PMT) storing a digital copy control descriptor that includes digital copy control information (digital recording control data), and the digital copy control information controls a copy generation of the broadcast content as shown in FIG. 1.

Referring to FIG. 1, digital copy control information "10" represents "copy-one-generation" (hereafter, referred to as "copy-once"). This means that, when a digital broadcasting content has the digital copy control information "10", the content can be copied one time only (copy-once). Further, when the digital copy control information is "00", the content can be copied without any limitation (copy-free), and when the digital copy control information is "11", the content cannot be copied (copy-no-more).

Due to the introduction of the "copy-once" control into the digital broadcasting, for example when a copy-once digital broadcasting content is received using a digital video recorder carrying a hard disk drive (HDD), a recording type digital versatile disk (DVD), or the like, and then recorded (copied) onto the HDD or the DVD in the digital video recorder, the recorded content is accumulated as "copy-no-more" so that the content cannot be further copied. Note that even after the content is accumulated as "copy-no-more", it is not necessary to change the value "10" of the digital copy control information in the digital copy control descriptor.

Also note that the accumulated content whose status has been changed from "copy-once" to "copy-no-more" cannot be copied, but can be moved, namely transferred. For example, the content can be transferred to an external recording medium enabling copyright protection such as Content Protection for Recordable Media (CPRM). Note that, however, the content can be moved to only a single recording medium digitally connected to or built in the digital video recorder. In case that the content is moved to such a recording medium which is connected via a high-speed digital interface, it is necessary to conform regulations of Digital Transmission Content Protection (DTCP).

Note that when the content has been moved, the content recorded in the move source, namely the HDD or the DVD, should be deleted or disabled from being reproduced. This means that when the move is complete, the contents must not be available both in the move source and the move destination at the same time.

Meanwhile, such introduction of the "copy-once" control has a risk of losing user's convenience in the following case.

The case is when the recorded content (former copy-once) used to be a high-quality content, but it is converted into a lower-quality one, by being lowered its quality, namely image and sound quality of the content, in order to be moved. After the content has once been converted into the low-quality content and moved, the content is reproduced only as the low-quality content even if the content is moved backwards to the move source. This means that those who wish to watch or listen to the content cannot play the content with the original high quality.

More specifically, regarding the move accompanied with the conversion, there is a case that the copy-once content in the move source is a high-quality High Definition (HD) image and recorded on HDD or Blu-ray Disk, but the move destination is a medium having a small recording capacity, such as a DVD or a memory card, and the content is converted into a low-quality Standard Definition (SD) image to be moved. However, the content converted from the HD image to the SD image is generally not able to be converted backwards from the SD image to the HD image, so that it is impossible to restore the original high-quality HD image, since the content has been compressed and encoded with a lower recording rate.

To address the above problem, Japanese Patent Laid-Open No. 2002-251819 publication for an invention entitled "Digital Information Recorder, Reproducing Device and Transmitter" discloses that, after a copy-once content is received and recorded, the disclosed technology controls to move and temporarily copy the content by managing its duplicable time period, playable time period, and the like by a clock. Thus, after the copy-once content is received and recorded, the content can be copied to another recording medium within a predetermined time period. Therefore, even if the high-quality content has been received and recorded, and then outputted as a low-quality content to another recording medium, the disclosed technology enables the user to play the content with the original high quality.

SUMMARY OF THE INVENTION

However, the above conventional technology violates the original regulation of "copy-one-generation" permitting the received content to be copied one time only, resulting in permitting "copy-free" with limitation. In addition, if the time limit is set to restrict the copying and the like, another control data besides "copy-once" is necessary, for example "copy-free-with-limitation" representing that copying is permitted for many times within a predetermined time limit, which results in increase of bit number in the copy control information.

To address the above problems, the following technique is conceivable to reproduce a content with original high quality even after the content with high quality has been converted into a low-quality content to be moved, and also to conform the original "copy-once" regulation, without increasing the bit number of copy control information.

When a high-quality content is converted into a low-quality content and then moved, the high-quality content in the move source is temporarily disabled from being reproduced. After that, when a backward move is performed for the content, in other words, the low-quality content in the move destination is moved backwards to the move source, namely a recording medium, the high-quality unreproducible content is re-enabled to be reproduced, and simultaneously the low-quality content in the move destination is deleted.

However, in the above technique, when the high-quality content in the move source remains unreproducible and user is not disclosed with any information regarding the content until the content in the move destination is moved backwards, a recording capacity in the move source, namely the recording medium, is reduced due to the content which the user cannot recognize, so that the user can not specify the reason of the capacity reduction and would misunderstand that the reduction is caused by some troubles.

In addition, even if the accumulated unreproducible content becomes no longer necessary, in other words, even if the content in the move destination is no longer necessary to be moved backwards to the move source, the user can not recognize such an unreproducible content so that the user can not delete it. That is, the recording capacity in the recording medium is wasted due to the existence of the unreproducible content.

In view of the above problems, it is an object of the present invention to provide a content management device that can reproduce a content having the same quality as the content before being moved has, even after the content has been moved lowering its quality, and also notify the user of information regarding the moved content in the move source.

In order to achieve the above object, according to the present invention, a content management device for managing a content transfer, the device includes: communication circuitry connected to a communication pathway and configured to output a copy of recorded content received via the communication pathway for storing on an external medium; content control circuitry configured to control the output of recorded content and disable the reproduction of the recorded content when the copy is output; and information output circuitry configured to output externally attribute information comprising at least reproduction status information.

Accordingly, the content management device of the present invention can output the copy of the recorded content that is received via the communication pathway for storing on the external medium, and disable the reproduction of the recorded content.

Furthermore, the content management device of the present invention can output the attribute information of the unreproducible content. Still further, the recorded content is actually recorded on a recording medium although it cannot be reproduced, so that the content management device of the present invention enables the user to play the content having the same quality as the content before being disabled from being reproduced has.

The content management device according the present invention further includes deletion circuitry configured to delete the recorded content that is disabled from being reproduced.

Accordingly, the content management device of the present invention enables the user to select from the unreproducible contents for a content that is no longer necessary, in other words, that the content is no longer necessary to be reproduced, and delete the content.

The present invention can provide a content management device which can reproduce a content with the same quality as the content before being moved has, even after the content has been moved lowering its quality, and notify the user of information regarding the moved content in the move source.

Thus, according to the present invention, even if a high-quality copy-no-more content, which used to be a copy-once content, has been converted into a low-quality content and then moved, such a content is re-enabled to be reproduced by being moved backwards to the move source, and then able to be reproduced with the original high quality. Further, even if the high-quality content has been disabled from being reproduced and stored in the move source, it is possible to output attribute information such as a title and a recording size of the content. That is, it is possible to notify the user of which contents cannot be reproduced and of how much those contents occupy in a recording capacity of a recording medium, which improves user's convenience without causing user's misunderstandings.

Still further, when the stored unreproducible content becomes no longer necessary, the user can delete such a content thereby effectively using a limited recording capacity in the recording medium.

FURTHER INFORMATION ABOUT TECHNICAL BACKGROUND TO THIS APPLICATION

The disclosure of Japanese Patent Application No. 2004-347543 filed on Nov. 30, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1 is a diagram showing digital copy control information;

FIG. 5A is a diagram showing a recording area 208 in the content management device 101, and a data management area 701 and a data area 702 forming the recording area 208, according to the present embodiment;

FIG. 5B is one example of management information accumulated in the data management area 701, according to the present embodiment;

FIG. 5C is one example of data accumulated in the data area 702 in units of clusters, according to the present embodiment;

FIG. 6 is a diagram showing an event information table (EIT) and its descriptors representing program information of the received digital broadcasting, according to the present embodiment;

FIG. 7 is a diagram showing image quality and aspect ratios designated by component descriptors in the EIT of the received digital broadcasting, according to the present embodiment;

FIG. 8 is a diagram showing genres of programs designated by content descriptors in the EIT of the received digital broadcasting, according to the present embodiment;

FIG. 10A1 is a diagram showing one example of a general menu displayed on a display, according to the present embodiment;

FIG. 10A2 is a diagram showing one example of a recorded file menu displayed on the display, according to the present embodiment;

FIG. 10B1 is a diagram showing another example of the general menu displayed on the display, according to the present embodiment;

FIG. 10B2 is a diagram showing another example of the recorded file menu displayed on the display, according to the present embodiment;

FIG. 10B3 is a diagram showing that a moved file menu display button is selected on the recorded file menu shown in FIG. 10B2, according to the present embodiment;

FIG. 10B4 is a diagram showing that only moved files are displayed on the display, according to the present embodiment;

FIG. 11 is a diagram showing one example in which the attribute information of all contents recorded in the recording area 208 are displayed, according to the present embodiment;

FIG. 12A is a diagram showing that contents of move with conversion and a content of general move are selected from contents recorded in the recording area 208 in the content management device 101, according to the present embodiment;

FIG. 12B is a diagram showing changes of displayed attribute information of the contents after the contents have been moved based on the selection shown in FIG. 12A, according to the present embodiment;

FIG. 13A is a diagram showing that attribute information of only reproducible contents are displayed, according to the present embodiment;

FIG. 13B is a diagram corresponding to FIG. 10B4 and showing attribute information of only unreproducible contents are displayed, according to the present embodiment;

FIG. 14A is a diagram showing that attribute information of all contents recorded in the recording area 208 in the content management device 101 are displayed, and from the contents the fifth content is selected to be moved backward, according to the present embodiment;

FIG. 14B is a diagram showing changes of the displayed attribute information of the content that has been moved backward, according to the present embodiment;

FIG. 15A is a diagram showing that attribute information of all contents recorded in the recording area 208 in the content management device 101 are displayed, and from the contents the first and third contents are selected to be deleted, according to the present embodiment;

FIG. 15B is a diagram showing that attribute information of the deleted contents are not displayed, according to the present embodiment;

DESCRIPTION OF THE PREFERRED EMBODIMENT

The following describes the best embodiment for carrying out the present invention with reference to the drawings.

Figure 2:
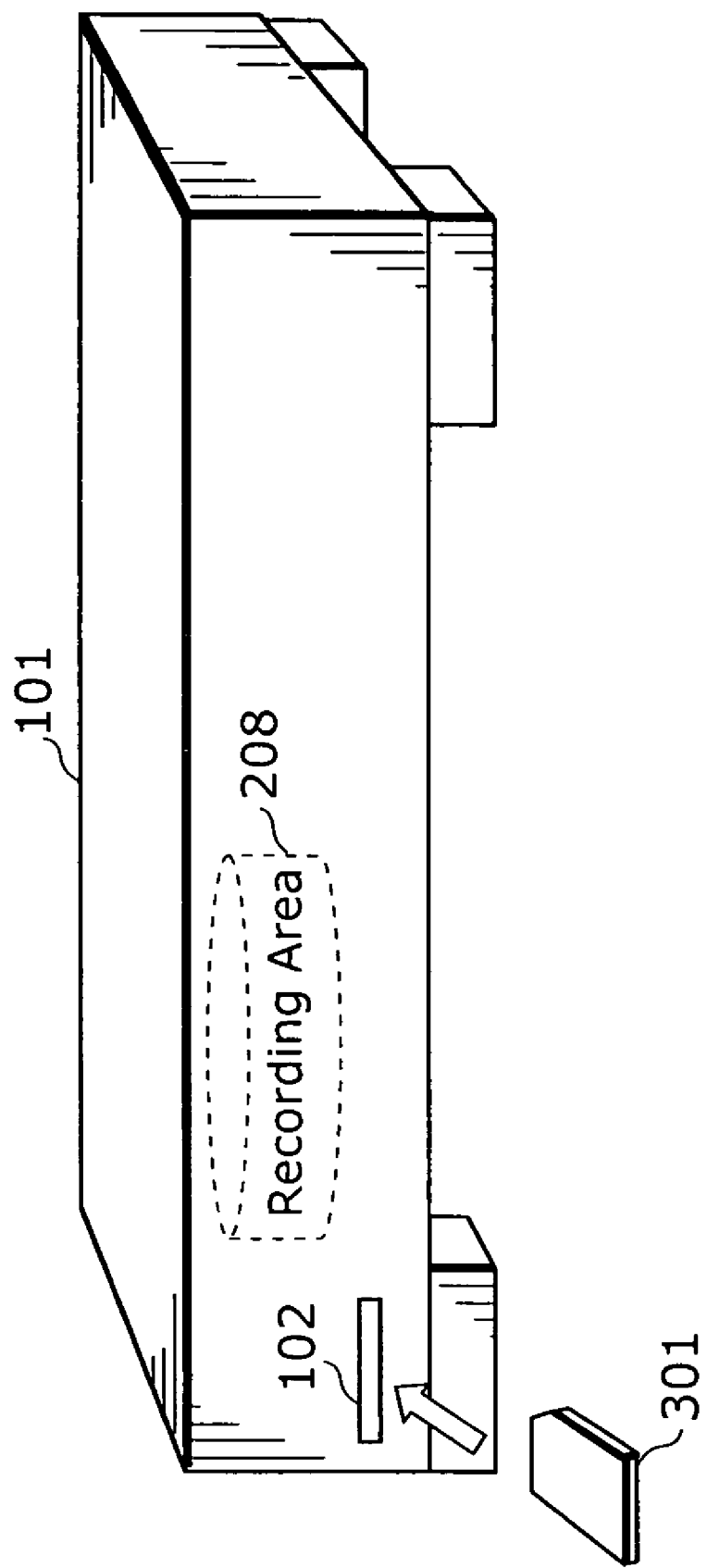
FIG. 2 is a diagram showing an external view of a content management device 101 and an external recording medium 301, according to the present embodiment.
Figure 3:
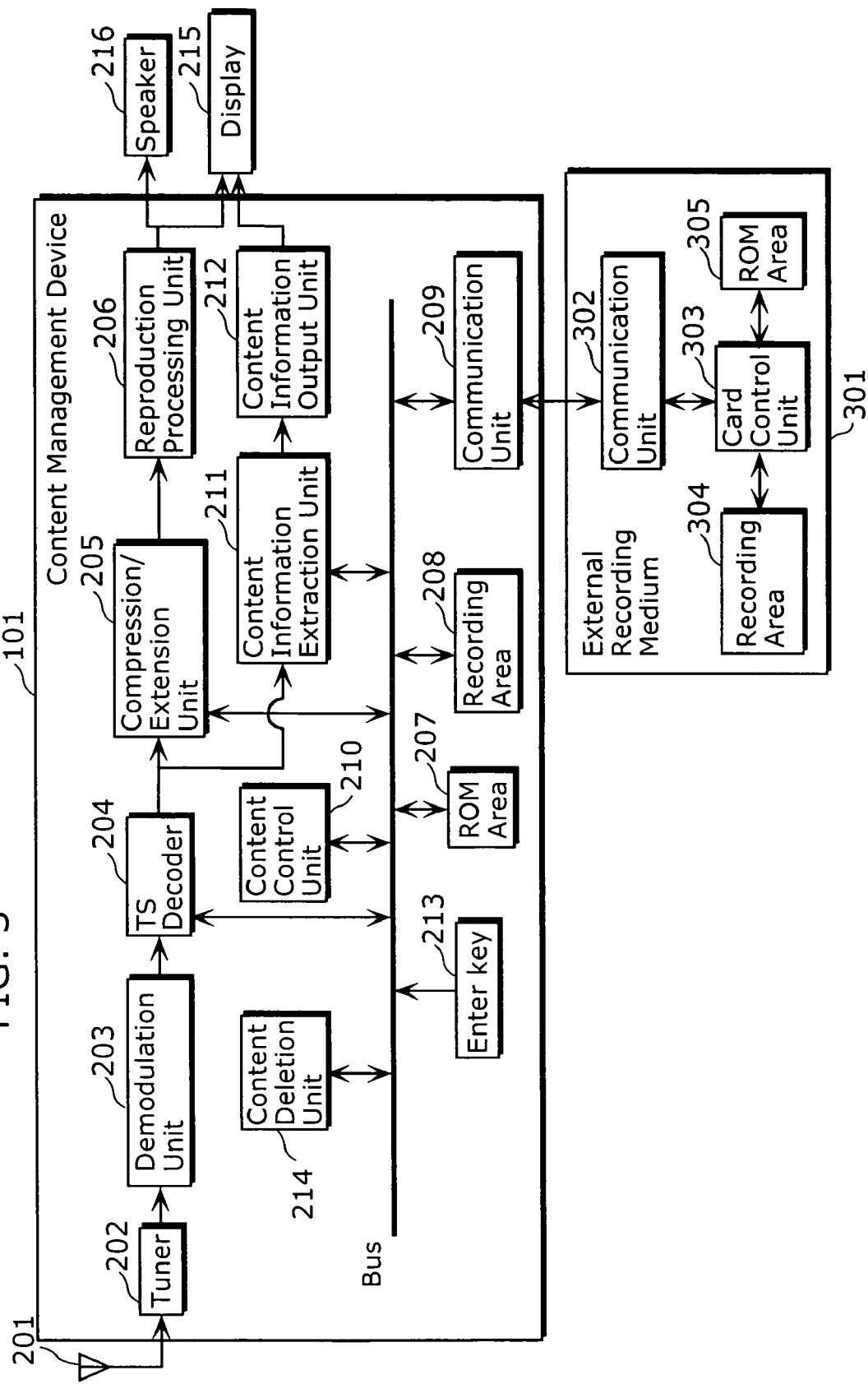
FIG. 3 is a block diagram showing structures of the content management device 101 and the external recording medium 301, according to the present embodiment.
Figure 4:
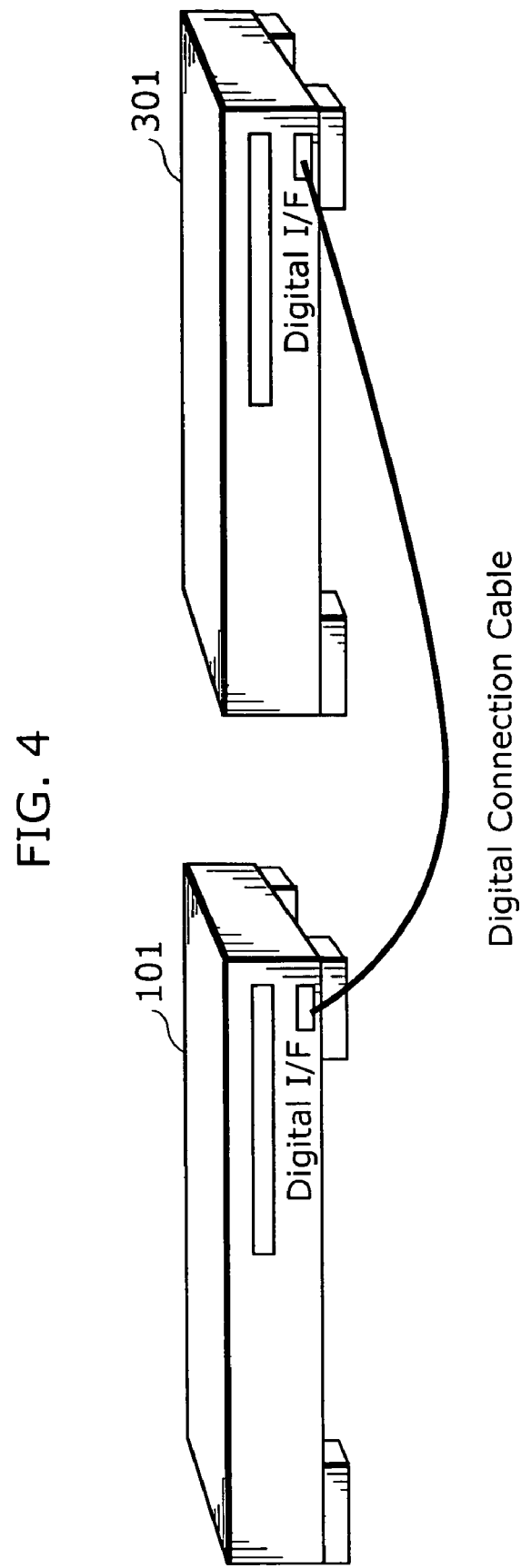
FIG. 4 is a diagram showing an external view of the content management device 101 digitally connected with another content management device, according to the present embodiment.

Referring first to FIGS. 2 to 4, structures of a content management device 101 and an external recording medium 301 of the present embodiment are described.

FIG. 2 is a diagram showing an external view of the content management device 101 and the external recording medium 301 according to the present embodiment. In the present embodiment, the content management device 101 is a record reproducing device, such as a hard disk recorder or a DVD recorder, carrying a recording medium with a large recording capacity, such as a hard disk or a DVD.

A data format of data recorded in the recording area 208 will be described further below with reference to FIG. 5A to FIG. 5C.

The external recording medium 301 is one example of an external medium in the content management device according to the present invention. In the present embodiment, the external recording medium 301 is a memory card that enables copyright protection such as CPRM. A memory card insertion slot 102 is formed in the content management device 101 so that the external recording medium 301 is inserted thereto.

FIG. 3 is a block diagram showing structures of the content management device 101 and the external recording medium 301 according to the present embodiment. An interface (not shown) is formed in the memory card insertion slot 102 (shown in FIG. 2) of the content management device 101, and connected with the external recording medium 301 that is inserted into the memory card insertion slot 102. Via the interface, the content management device 101 outputs data to be stored on the external recording medium 301, and the external recording medium 301 outputs externally unique information of the external recording medium 301 to the content management device 101.

In the present embodiment, the content management device 101 is assumed as a stationary hard disk recorder. The content management device 101 processes a digital television broadcast signal received by an antenna 201, and reproduces an image and a sound by a display 215 and a speaker 216.

Those skilled in the art will appreciate that the content management device 101 may be other devices, such as a DVHS recorder or a recorder using a next generation disk. The external recording medium 301 may be a removable hard disk besides the recordable DVD disk, or, as shown in FIG. 4, another hard disk recorder or DVD recorder like the content management device 101 that is connected with the content management device 101 via a digital cable. However, when data is outputted and inputted between the digitally connected content management device 101 and external recording medium 301, the data should be inputted and outputted via a communication pathway that is authenticated based on a digital connection standard such as DTCP, and that ensures security to prevent forgery and theft, using encryption technology and the like.

Referring back to FIG. 3, the content management device 101 includes a tuner 202, a demodulation unit 203, a TS decoder 204, a compression/extension unit 205, a reproduction processing unit 206, a ROM area 207, a recording area 208, a communication processing unit 209, a content control unit 210, a content information extraction unit 211, a content information output unit 212, an enter key 213 and a content deletion unit 214. Note that the reproduction processing unit 206 is connected with the display 215 and the speaker 216.

The external recording medium 301 includes a communication processing unit 302, a card control unit 303, a recording area 304, and a ROM area 305.

The content management device 101 and the external recording medium 301 output and input data by a master/slave method by which the content management device 101 serves as a master and the external recording medium 301 serves as a slave, via the communication processing unit 209 and the communication processing unit 302.

This means that the external recording medium 301 sends, to content management device 101, a response in reply to a command from the content management device 101. The external recording medium 301 also sends data to the content management device 101. The above response and data are outputted to be synchronized with a transmission clock transmitted from the content management device 101.

Next, a function of each element in the external recording medium 301 is described.

The card control unit 303 analyzes a command which the communication processing unit 302 receives from the content management device 101, and controls each element in the external recording medium 301, based on the analysis result. In addition, the card control unit 303 has functions of causing the communication processing unit 302 to send the command processing result as a response to the content management device 101, and of recording, based on a request from the content management device 101, the data received via the communication processing unit 302 into the recording area 304, and causing the communication processing unit 302 to send the recorded data to the content management device 101.

Into the ROM area 305, the unique information of the external recording medium 301 is recorded. The unique information is unique to the external recording medium 301, and no other external recording media have the same information. This information can be read out, but cannot be overwritten.

The recording area 304 store data which the communication processing unit 302 receives from the content management device 101, under the control of the card control unit 303. When there is a request from the content management device 101 to read out the stored data, the data recorded in the recording area 304 is sent via the communication processing unit 302 to the content management device 101, under the control of the card control unit 303.

Furthermore, when there is a request from the content management device 101 to change or delete the stored data, the data recorded in the recording area 304 is changed or deleted, under the control of the card control unit 303. In the present embodiment, the recording area 304 is a semiconductor memory such as a flash memory.

Next, functions of each element in the content management device 101 are described.

The antenna 201 receives digital broadcast signals (digital data streams) including compressed image data and compressed audio data sent from a broadcasting station.

The tuner 202 retrieves, from the broadcast signals of all channels received by the antenna 201, a broadcast signal of a specific channel selected by the user. Note that the selected broadcast signal has a specific frequency and is one of the multiplexed broadcast signals. The demodulation unit 203 demodulates the digital broadcast signal retrieved by the tuner 202 into a baseband signal in order to generate a transport stream (hereafter, referred to as "TS") to be outputted to the TS decoder 204.

The TS decoder 204 decodes the TS. The broadcast signal is a TS in which compressed image data, compressed audio data, a transmission control signal, service information (SI) for facilitating selection of broadcast programs, and data for data broadcasting are multiplexed. The multiplexed TS has been encoded with an error correcting code and scrambled to be transmitted. The TS decoder 204 descrambles and decodes with an error correcting code the TS supplied from the demodulation unit 203, and then separates the TS into the compressed image data, the compressed audio data, the transmission control signal, the SI, and the data for data broadcasting which have been multiplexed. Then, the TS decoder 204 transmits them as compressed content data to the compression/extension unit 205.

On the other hand, the TS decoder 204 further transmits the TS of the designated specific channel that has been descrambled and decodes with the error correcting code to the recording area 208. Note that in the multiplexed TS transmitted to the recording area 208, the compressed image data, the compressed audio data, the transmission control signal, the SI, and the data for data broadcasting have been added with Packet IDs (PIDs) regarding the selected channel (hereafter, referred to as "specific channel multiplexed TS").

When the specific channel multiplexed TS is transmitted to the recording area 208, the specific channel multiplexed TS is decoded into the compressed image data, the compressed audio data, the transmission control signal, the SI, and the data for data broadcasting and transmitted to the content information extraction unit 211. Note that in the present embodiment, the digital signal stream which the content management device 101 receives is a stream in a MPEG2-TS format.

The compression/extension unit 205 decodes the compressed content data supplied from the TS decoder 204, and transmits the image data and the audio data decoded from the compressed content data, to the reproduction processing unit 206. Alternatively, the compression/extension unit 205 further encodes the above decoded image data and the audio data which are obtained by decoding the compressed content data supplied from the TS decoder 204, and outputs the further encoded data as compressed content data to the reproduction processing unit 206.

Note that, in the above case, the further encoding is applied to the decoded image and/or audio data, lowering quality of those data compared to quality before being further encoded. More specifically, the decoded image and/or audio data are converted into low definition and sampled with a low rate, then further encoded with a low encoding bit rate. Alternatively, the decoded image and/or audio data are converted into the same definition and sampled with the same rate, but further encoded with a high compressibility, namely with a lower encoding bit rate. Furthermore, in the above case, the compressed content data to be decoded and further encoded in the compression/extension unit 205 is obtained by decoding the above specific channel multiplexed TS recorded in the recording area 208 by the TS decoder.

The reproduction processing unit 206 receives a content that is the data decoded in the compression/extension unit 205, and outputs the content as a digital signal or an analog signal. The image data is outputted to the display 215, and the audio data is outputted to the speaker 216.

The ROM area 207 holds the unique information of the content management device 101, and when digital data in the content management device 101 is transmitted to other record reproducing devices, the unique information is used as a two-way authentication ID for the data transmitted between the content management device 101 and the record reproducing device via the communication processing unit 209.

The recording area 208 stores received contents and information for managing the contents. Note that in the present embodiment, the recording area 208 is assumed as a hard disk drive.

FIG. 5A is a diagram showing the recording area 208 in the content management device 101, and a data management area 701 and a data area 702 forming the recording area 208. FIG. 5B is one example of management information accumulated in the data management area 701. FIG. 5C is one example of data accumulated in the data area 702 in units of clusters.

Referring to FIG. 5A, the recording area 208 includes; a data management area 701 that accumulates information for managing the received content; and a data area 702 that accumulates the content itself. The recording area 208 can store the contents and the information for managing contents which can be read out and edited, if necessary.

Referring to FIG. 5B, in the data management area 701, a series of management information regarding the data accumulated in the data area 702 are arranged. For example, the series of management information are: program information regarding program details of the content received from the content information extraction unit 211; reproduction status information regarding the contents controlled by the content control unit 210; a recording period and a recording size by which the received content is accumulated in the recording area 208; and the like.

In the data area 702, the content (the specific channel multiplexed TS) received from the TS decoder 204 is accumulated in units of clusters as shown in FIG. 5C.

When there is a request to read out the content in the recording area 208, the accumulated content is outputted to the TS decoder 204, the content control unit 210, the content information extraction unit 211 or the communication processing unit 209.

Referring again to FIG. 5B, a description is given more specifically for each content management information recorded in the data management area 701 of the recording area 208.

The content management information includes a content number 710, a genre 711, a title 712, a recording date 713, a recording period 714, a recording size 715, a format 716, a file attribute 800, a data cluster number 721, and a moved data cluster number 722. The file attribute 800 further includes a reproduction 718, a copy 719, and a move 720, which are file attributes for representing file status. Note that those management information are outputted to the display 215 to be displayed to the user, and one example of such information displayed on the display 215 is indicated under the arranged information in FIG. 5B. Display examples of the display 215 will be described more specifically further below with reference to FIG. 10A1 to FIG. 15B.

Note that, the terms "to move" or "a move" in the following description means, if not defined specifically, disabling reproduction of an original content recorded in the recording area 208, instead of deleting it, accumulating the unreproducible content, and converting and compressing the original content to generate a copy of the recorded content, and recording the copy onto the external recording medium.

The content number 710 is an ID number unique to the content. The ID number is automatically generated at random by a random generator (not shown) when the content is recorded. Note that a numeric value of the ID is set to be used when the content is further encoded (for example, converted into a content with different definition, and then further compressed and encoded with MPEG-2) by the compression/extension unit 205 and moved to the external recording medium 301.

More specifically, certain data for the user is added to a sequence layer of MPEG-2. The data for the user is a sequence extension code and indicated by integral multiple of eight bits. For example, the content number 710 is indicated as "00101110" as the data for the user, and compressed together with the content data. As described further below, the content number 710 indicated as the data for the user is decoded together with the compressed content data when the content is moved backwards to the move source, so that the content number 710 is used for determining whether or not the content number that is decoded after being moved backwards corresponds to the content number 710 of the content that has been disabled from being reproduced, and recorded in the recording area 208 after having been moved. This means that it is possible to determine whether or not the content moved backwards is the actual content that has been moved to.

The genre 711 is formed by recording a numeric value representing a program genre that is read out from a content descriptor extracted by the content information extraction unit 211 from an event information table (EIT) in the SI in the TS. For example, a movie is represented as "0x6". The EIT will be described further below with reference to FIG. 6. The program genre designated by the content descriptor in the EIT will also be described further below with reference to FIG. 8.

The title 712 is formed by recording a numeric value (integral multiple of eight bits) representing a program title that is read out from a short event descriptor extracted by the same content information extraction unit 211 from the EIT in the TS. Note that the numeric value is converted into a character using designated language code and character information.

The recording date 713 is formed by reading out, from an inside clock (not shown), recording start date including month, day, and year regarding the content received in the recording area 208, and digitalizing and recording the date.

The recording period 714 is formed by reading out, from the inside clock (not shown), a recording start time and a recording end time regarding the content received in the same recording area 208, calculating a recording period using an arithmetic circuit (not shown), and recording the recording period.

The recording size 715 is formed by counting the cluster numbers of the content data recorded in the data area 702 of the recording area 208, calculating a recording size using an arithmetic circuit (not shown) and recording the recording size.

The format 716 is formed by recording a numeric value of component detail and component classification regarding the received program that is read out from a component descriptor extracted by the content information extraction unit 211 from the EIT in the TS. For example, when an image is 1080i, an aspect ratio is 16:9, and a pan vector exists, the component detail is "0x01" and the component classification is "0xB2". Examples of image quality and the aspect ratio designated by the component descriptor in the EIT will be described further below with reference to FIG. 7.

The reproduction 718 in the file attribute 800 is formed by recording information representing whether the content can be reproduced (Reproduction OK) or cannot be reproduced (Reproduction NG). When the received content has not been moved, the content can be reproduced, and a file attribute of the content, if the content is considered as a file, is recorded as a mode by which the content can be read out. When the content cannot be reproduced, the file attribute is recorded as a mode by which the content cannot be read out. Further, when the content has once been recorded, the file attribute is recorded as a mode by which the content cannot be overwritten, unless a command is issued to delete the content.

Note that when the attribute is recorded according to the determination of whether the content is reproducible or unreproducible, the determination is made based on whether or not the copy-once content accumulated in the recording area 208 has been moved under the control of the content control unit 210. Alternatively, the determination is made based on whether or not the content that has been moved from the recording area 208 is moved backwards to the recording area 208. This means that if the copy-once content received in the recording area 208 has been moved, then an attribute of the content is changed from a reproducible mode to an unreproducible mode, while if the content is moved backwards to the recording area 208, the attribute is changed from the unreproducible mode to the reproducible mode. Note that the mode of the reproduction 718 is, for example, digitalized by one bit and represents the reproducible mode as "0" and the unreproducible mode as "1".

The copy 719 in the file attribute 800 is formed by recording information representing whether the content can be copied (Copy OK) or cannot be copied (Copy NG). The copy 719 stores digital copy control information of a digital copy descriptor extracted by the content information extraction unit 211 from the PMT in the TS. Referring again to FIG. 1, when the received content is a copy-once content on "copy-one-generation" status, the copy 719 is recorded as "10" corresponding to a display indicating that the content cannot be copied. Further, when the content is a copy-free content, the copy 719 is recorded as "00" corresponding to a display indicating that the content can be copied. Note that a numeric value recorded in the copy 719 is converted by the content information output unit 212 to be displayed.

The move 720 in the file attribute 800 is formed by recording information representing whether or not the content can be moved. When the received content is a copy-once content and has once been moved, the content is assigned a value corresponding to a display of "Moved". When the content has not been moved, the content can be moved so that the content is assigned a value corresponding to a display of "Move OK". Further, when only a part of the received content, for example, a later part of the content has been moved, the content is assigned a value corresponding to a display of "Moved Partly". Still further, when the received content cannot be copied (digital copy control information is "11"), the content also cannot be moved so that the content is assigned a value corresponding to a display of "Move NG". Note that the values representing "Moved", "Moved Partly", "Move OK", and "Move NG" are recorded by a value of two bits.

The data cluster number 721 is formed by recording cluster numbers in which substance data of the content recorded in the data area 702 of the recording area 208 is arranged. Note that when the cluster numbers are made up of a sequence of consecutive clusters, it is possible to designate and record the number of clusters counted from a first cluster number.

The moved data cluster number 722 is formed by recording cluster numbers in which substance data of the content moved from the data area 702 is arranged, when the content received and recorded in the recording area 208 is moved. Note that, to be exact, it is not the substance data of the content that is moved, but copy data corresponding to the substance data.

Also note that, when the cluster numbers are a sequence of consecutive clusters, it is possible to designate and record the number of the consecutive clusters following the first cluster number.

The information recorded in the data management area 701 as described above are not accessed directly by the user so that those information needs to be converted and displayed as information which the user can recognize. On the other hand, the information recorded in the content number 710, the data cluster number 721, and the moved data cluster number 722 are not outputted and displayed for the user.

FIG. 5C is a schematic diagram showing arrangement of the content data recorded in the data area 702. Referring to FIG. 5C, cluster numbers 0033 to 0040 and cluster numbers 0055 to 0060 shown in dotted parts represent that the content data is stored therein.

Here, the content data is the TS in which the compressed image data, the compressed audio data, the data for data broadcasting, the transmission control information, and the SI regarding the program are multiplexed. Note that if the content has been moved, the content data is an encrypted TS.

Note that data alignment in the data management area 701 and the data area 702 may be applied with an existing file system such as a file allocation table (FAT) or an universal disk format (UDF). Furthermore, it is possible to record more specific program details as information to be managed in the data management area 701. On the contrary, it is possible to record more summarized information. Note that the present embodiment has described that a part of the data management information, such as the title name, the genre, and the format, are extracted from the received broadcast signal, but it should be appreciated that such information may be downloaded via a modem (not shown) from the Internet in conjunction with the broadcasting, or that the user may write such information using the enter key 213 into the data management area 701.

The communication processing unit 209 is one example of communication circuitry of the content management device according to the present invention, and in the present embodiment, The communication processing unit 209 is an I/F that transmits data, control signals, electric power, and the like, between the communication processing unit 209 and the communication processing unit 302 in the external recording medium 301. Note that when digital data is transmitted via the I/F, it is necessary to satisfy the digital connection standard that enables content copyright protection. For example, the I/F needs to establish a communication pathway that is authenticated based on a DTCP and the like, and that ensures security to prevent forgery and theft when inputting and outputting data, using encryption technology and the like.

The content control unit 210 is one example of a processing unit that implements functions of content control circuitry for disabling and re-enabling the reproduction of the recorded content. The content control unit 210 disables from being reproduced, re-enables to be reproduced, and deletes a content, which has been moved or moved backwards, and the like recorded in the external recording medium 301.

When a content is moved, more specifically, when a copy-once content recorded in the recording area 208 is converted into a low-quality compressed content data by the compression/extension unit 205 and then moved to the external recording medium 301, the content control unit 210 disables the reproduction of the copy-once content in the recording area 208.

On the other hand, when the moved content is moved backwards, more specifically, when the low-quality content is moved backwards from the external recording medium 301 being the move destination to the content management device 101 being the move source, the content control unit 210 re-enables the reproduction (restoration) of the unreproducible content stored in the recording area 208.

The present embodiment describes a case when the content control unit 210 implements to disable a content from being reproduced and then re-enable the content to be reproduced, using encryption and decryption.

Firstly, when a content is moved, the content control unit 210 controls the following processing in order to disable the reproduction of the content in the move source.

Using the unique information of the content management device 101 that is read out from the ROM area 207 and the unique information that is read out from the external recording medium 301, authentication is made whether or not data can be securely transferred between the content management device 101 and the external recording medium 301.

When a content to be moved (hereafter, referred to as "content A") is selected from contents recorded in the recording area 208 of the content management device 101, a content number specifying the content A is read out from the content number 710 in the data management area 701. Then the content number that is read out is supplies to the compression/extension unit 205 as described further below.

Further, data of the content A in the data area 702 (hereafter, referred to as "TS content A") is read out. Then, the TS content A that has been read out is supplies to the TS decoder 204. Still further, cluster numbers of the data of the TS content A that have been actually read out are written into the moved data cluster number 722 in the data management area 701.

Packetized elementary stream (PES) data of image and audio (hereafter, referred to as "compressed content data A") that have been separated from the TS by the TS decoder 204 is once extended by the compression/extension unit 205 to form baseband image data and baseband audio data.

The baseband image and the baseband audio data are added with the above content number that has been read out from the recording area 208, and are supplied to the compression/extension unit 205. Here, if the content number is compressed with MPEG-2, the content number is added as the data for the user that is a sequence extension code in the sequence layer.

Then the baseband image and the baseband audio data are further compressed by the compression/extension unit 205 to form a content having lower definition or a lower encoding bit rate than those of the original data, resulting in compressed content data B. The compressed content data B is one example of a "copy" of the original content in the content management device according to the present invention.

Furthermore, a title key to be served as an encryption key is automatically generated at random, and the compressed content data B is encrypted using the title key. Furthermore, the TS content A that has been designated to be moved in the recording area 208 is encrypted with the same title key.

Note that the encrypted TS content A is formed by encrypting, to be exact, data of the cluster numbers written in the moved data cluster number 722 of the content A in the data management area 701. This means that the encrypted data is data of the content A corresponding to the data to be moved (compressed content data B). For example, if the data corresponding to the data to be moved which has been read out is actually a part of the content A, the data (the part of the content A) corresponds to the compressed content data B to be moved, which means that only a data portion of the content A which has been actually read out is encrypted. The above case is relevant to a display of "Moved Partly" as described further below.

Using the unique information obtained from the external recording medium 301, the above title key is encrypted. The encrypted title key and the encrypted compressed content data B are copies to the external recording medium 301.

Note that the encrypted title key is copied in a secret area between a copying device and a media or between the devices, where the user cannot access, so that the user cannot copy the encrypted title key only, without authorization.

When the encrypted title key and the encrypted compressed content data B are copied to the external recording medium 301, simultaneously in the content management device 101, the encrypted title key, the encrypted compressed content data B, and the obtained unique information of the external recording medium 301 are deleted. Therefore, the encrypted TS content A in the recording area 208 cannot be decrypted thereby being disabled from being reproduced. On the other hand, into the external recording medium 301, the encrypted compressed content data B is copied, resulting in the same situation as when the content has been moved from the content management device 101 to the external recording medium 301.

Next, when the moved content in the move destination is moved backwards to the move source, the content control unit 210 controls the following processing in order to re-enable the reproduction of the content in the move source.

Using the unique information of the content management device 101 that is read out from the ROM area 207 and the unique information that is read out from the external recording medium 301, authentication is made whether or not data can be securely transferred between the content management device 101 and the external recording medium 301.

The encrypted title key is obtained from the external recording medium 301. Simultaneously, the unique information of the external recording medium 301 is obtained from the external recording medium 301.

The encrypted title key obtained from the external recording medium 301 is decrypted using the unique information obtained from the external recording medium 301, generating a decrypted title key.

The encrypted compressed content data B is read out from the external recording medium 301. The encrypted compressed content data B that has been read out is decrypted with the decrypted title key. The decrypted compressed content data B is decoded in the compression/extension unit 205. From the decoded compressed content data B, the content number added as the data for the user is read out.

Then, content numbers of all contents are read out from the data management area 701 in the recording area 208.

Determination is made whether or not there is, in the content numbers that have read out from the data management area 701, a content number that matches the content number decoded in the compression/extension unit 205.

If a content number matching the content number decoded in the compression/extension unit 205 is found in the data management area 701, then the cluster numbers are read out from the moved data cluster number 722 that is associated with the found content number in the data management area 701. The readout cluster numbers belong to the data (the data of the encrypted TS content A) corresponding to the moved data.

Based on the readout cluster numbers, data of the encrypted TS content A is read out. Then, the readout data of the encrypted TS content A is decrypted with the decrypted title key.

When the data of the encrypted TS content A is decrypted, the encrypted title key and the encrypted compressed content data B in the external recording medium 301 are deleted. Then, the cluster numbers are deleted. Note that the cluster numbers are stored in the moved data cluster number 722 of the content A in the data management area 701 of the recording area 208.

In the above processing, the encrypted TS content A in the recording area 208 is decrypted thereby re-enabling the content A to be reproduced. At the same time, the encrypted compressed content data B in the external recording medium 301 is deleted, resulting in the same situation as when the content has been moved from the external recording medium 301 to content management device 101.

The present embodiment implements to disable the content from being reproduced and then re-enable the content to be reproduced, using encryption and decryption technique. The process of the encryption and decryption is not limited to the above description. Furthermore, it is possible to use other techniques without using encryption, if those techniques can perfectly disable the content from being reproduced and then re-enable the content to be reproduced.

The content information extraction unit 211 is one example of extraction circuitry in the content management device according to the present invention. The content information extraction unit 211 filters the transmission control signal and the SI from the compressed image data, the compressed audio data, the transmission control signal, the SI, and the data for data broadcasting, which have been converted into the PES by the TS decoder 204, and extracts information regarding the content, such as the title, the genre, and the copy control information. The extracted information regarding the content is supplied to the data management area 701 in the recording area 208.

The title, the genre, the copy control information and the like regarding the content are extracted from the SI and the transmission control signal.

FIG. 6 is a diagram showing the EIT and its descriptors extracted from the SI. Referring to FIG. 6, a short event descriptor of the EIT represents a name and brief information of a program. An extended event descriptor represents detailed information of a program for each item. A component descriptor represents information of each component forming a program, for example, image quality (types of 1080i, 720p, 480p, 480i, and the like) and an aspect ratio shown in a table of FIG. 7. A content descriptor represents a genre of a program as shown in FIG. 8.

In addition, a digital copy control descriptor arranged in the PMT of the transmission control signal represents the digital copy control information for controlling a copy generation of a broadcast content as shown in FIG. 1.

Moreover, the content information extraction unit 211 checks information of whether or not a copy-once content recorded in the recording area 208 has been converted and moved to the outside, namely whether the content is moved or not, since the content has been disabled from being reproduced or re-enabled to be reproduced by the content control unit 210, and then, based on the information, changes a mode of the move 720 of the file attribute 800 in the data management area 701 of the recording area 208. More specifically, the content information extraction unit 211 checks data of the moved data cluster number 722 in the data management area 701, and if the data of the cluster numbers of the moved data in the moved data cluster number 722 is found, then changes the mode of the move 720 to a code indicated as "Moved" representing that the content cannot be further moved. If there is no data of the cluster numbers of the moved data, the mode of the move 720 is changed to a code indicated as "Move OK" representing that the content has not been moved so that it can be moved.

Note that when the mode of the move 720 is "Moved", the data of the moved data cluster number 722 is compared with the data of the data cluster number 721 where all data cluster numbers of the content are written, and if the data of the data cluster number 721 does not match all data of the moved data cluster number 722, in other words, if some data of the data cluster number 721 do not exist in the moved data cluster number 722, the content information extraction unit 211 determines that a part of the content has been moved, and changes the mode of the move 720 to "Moved Partly".

Moreover, the content information extraction unit 211 reads out data from the genre 711, the title 712, the recording date 713, the recording period 714, the recording size 715, the format 716, and the file attribute 800 of the content, which are recorded in the data management area 701 of the recording area 208, and supplies them to the content information output unit 212.

The content information output unit 212 is one example of information output circuitry in the content management device according to the present invention, and converts data regarding the content data management information received from the content information extraction unit 211 (hereafter, referred to as "content attribute information"), into a signal to be displayed on the display 215. Subsequently, the converted signal is outputted to the display 215.

The content attribute information received from the content information extraction unit 211 is actually numeric values representing the attribute information, so that the content information output unit 212 has a table that stores the attribute information to be converted into character data and has a function of generating the character data as a signal in order to display the attribute information on the display 215. The content information output unit 212 previously includes the table in which, for example, if data of the genre 711 of a content is "0x6", the genre is "movie", if data of the format 716 is "0x01" or "0xB2", the format is "HD", and if data of the copy 719 of the file attribute 800 is "10" or "11", the copying is "Copy NG".

The content deletion unit 214 is one example of a deletion circuitry in the content management device according to the present invention, and outputs to the recording area 208 an unreproducible content deletion command for deleting the unreproducible (encrypted) copy-once content that is the moved data recorded in the recording area 208. The content is deleted by deleting the management information in the data management area 701 where the content is managed.

Here, when the management information is to be deleted, a file of the copy-once unreproducible content is set with a mode by which the content cannot be overwritten, so that it is necessary to release the overwrite prohibition mode before deleting the management information.

After deleting the management information, the information to specify the substance data of the content no longer exists, so that the substance data remains encrypted and is recognized as an empty data area. Note that, to completely delete the substance data of the content, it is possible to overwrite a numeric value generated as a random number, onto the data in the data area 702 where the substance data is recorded.

The enter key 213 is an operational keys accessorized with the content management device 101, and includes: keys for inputting instructions to display the attribute information of the unreproducible content recorded in the recording area 208; and a key for inputting instructions to delete the unreproducible content recorded in the recording area 208. The key input is operated by the user.

Note that the enter key 213 may be a key of a remote controller accessorized with the content management device 101.

Figure 9:
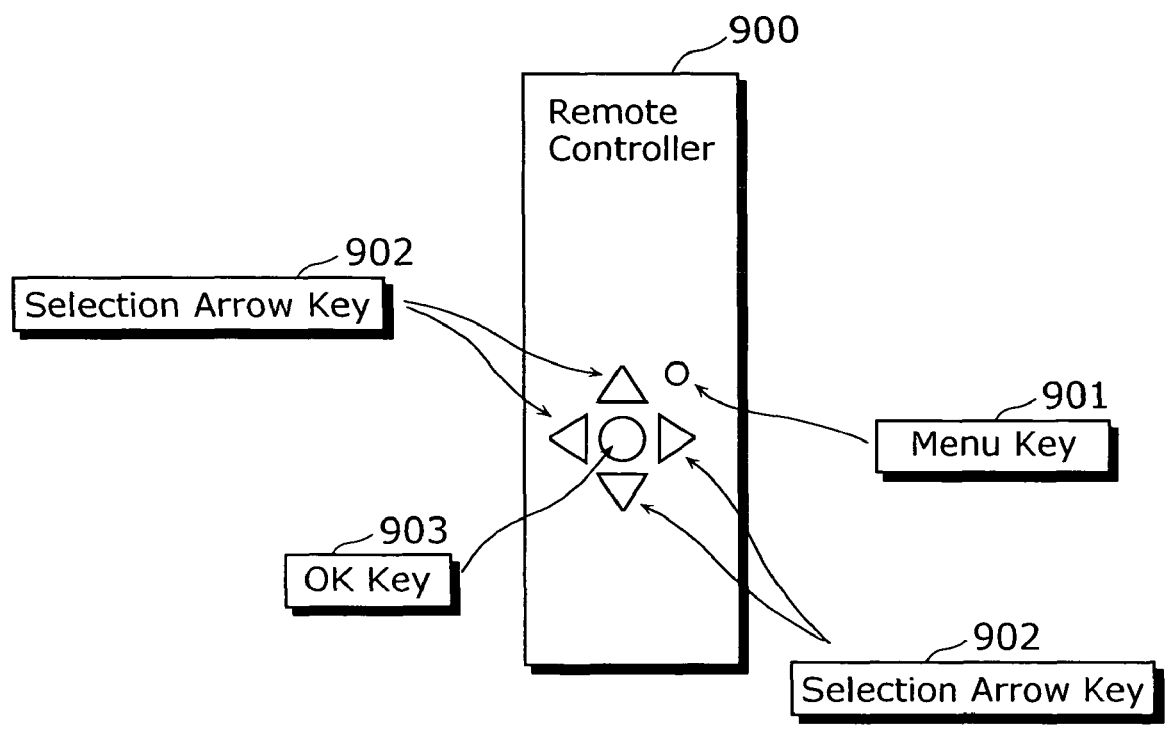
FIG. 9 is a diagram showing an external view of a remote controller 900 that is one example of an device for implementing a function of an enter key 213, according to the present embodiment.

FIG. 9 is a diagram showing an external view of the remote controller that is one example of a device for implementing the function of the enter key 213. Referring to FIG. 9, a remote controller 900 includes: a menu key 901; a selection arrow key 902 in conjunction with a selection screen displayed on the display 215; and an OK key 903 for determining a selection.

By operating the keys of the remote controller 900, the content attribute information recorded in the recording area 208 is extracted by the content information extraction unit 211, and displayed on the display 215 by the content information output unit 212.

The following describes display examples of the content attribute information displayed on the display 215 by user's operation of the keys of the remote controller 900, with reference to FIG. 10A1 to FIG. 15B.

FIG. 10A1 is a diagram showing one example of a general menu displayed on a display. FIG. 10A2 is a diagram showing one example of a recorded file menu displayed on the display. FIG. 10B1 is a diagram showing another example of the general menu displayed on the display. FIG. 10B2 is a diagram showing another example of the recorded file menu displayed on the display. FIG. 10B3 is a diagram showing that a moved file menu display button is selected on the recorded file menu shown in FIG. 10B2. FIG. 10B4 is a diagram showing that only moved files are displayed on the display.

When the user presses the menu key 901 of the remote controller 900, the general menu shown in FIG. 10A1 or 10B1 is displayed on the display 215.

When the user uses the selection arrow key 902 of the remote controller 900 to shift a selection bar to the third item "Recorded File Menu" on the general menu, and determines the selection by the OK key 903, a recorded file menu shown in FIG. 10A2 or FIG. 10B2 is displayed on the display 215. Note that difference between the recorded file menu shown in FIG. 10A2 and FIG. 10B2 is that all files (contents) recorded in the recording area 208 are displayed on the menu of FIG. 10A2, while only reproducible files (contents) are displayed on the menu of FIG. 10B2.

However, there is a possibility that the user makes a mistake during the operation when the unreproducible contents are displayed together with the reproducible contents as shown in FIG. 10A2. For example, there is a possibility that the user would be confused when the user selects a content that has been moved and then disabled from being reproduced in the move source and wishes to reproduce the content, but the user found that the content cannot be reproduced. Therefore, as shown in FIG. 10B2, it is possible to firstly display only the reproducible contents, then lead the user to further select a selection button of "Moved File Menu Display" if the user wishes to refer to the moved and unreproducible contents, and display only the moved files as shown in FIG. 10B4.

Note that, on the recorded file menu, operational buttons such as a delete button and a copy button are displayed.

On the recorded file menu, the user operates the selection arrow key 902 of the remote controller 900 to select a file (content) from the displayed files. Then, the user shifts the selection bar to one of the operational buttons and presses the OK key 903. When the OK key 903 is pressed, the content management device 101 moves (or moves backwards), deletes, or copies the selected file based on the pressed operational key.

The content attribute information in cases when the content recorded in the recording area 208 is moved, moved backwards, and deleted are described in more detail with reference to FIG. 11A to FIG. 15B.

FIG. 11 is a diagram showing an example in which the attribute information of all contents recorded in the recording area 208 are displayed. The attribute information of these contents are obtained when data to be displayed are extracted from the data in the data management area 701 of the recording area 208 by the content information extraction unit 211, and the data are converted into image signals to be displayed on the display 215 and outputted by the content information output unit 212.

Note that FIG. 11 shows an example in which the contents have not been moved. FIG. 11 also shows that the first to sixth contents are copy-once contents (their digital copy control information are "10"), and the seventh content is a copy-free content (its digital copy control information is "00"). This is shown by the remarks indicating the file attributes of the contents that are displayed as "Reproduction OK" for reproducible contents, "Copy NG" for non-copyable contents, and "Move OK" for movable contents regarding the first to sixth copy-once contents, while displayed as "Reproduction OK" for a reproducible content, "Copy OK" for a copyable content regarding the copy-free content. Note that the copy-free content can be copied, instead of being moved, so that there is no display regarding a move.

FIG. 12A is a diagram showing that contents to be moved after being converted and compressed (hereafter, referred to as "content move with conversion") and a content to be moved without being converted nor compressed (hereafter, referred to as "content with general move") are selected from contents recorded in the recording area 208 in the content management device 101. FIG. 12B is a diagram showing changes of displayed attribute information of the contents after the contents have been moved based on the selection shown in FIG. 12A.

In the above case, for the contents of move with conversion, the remarks about the reproduction are displayed as "Reproduction NG" representing the contents cannot be reproduced, and the remarks about the move are changed to "Moved" representing the contents have been moved. On the other hand, the fourth item "News" in FIG. 12A that is a content of general move is deleted and not displayed in FIG. 12B, because a original content of the content of general move is not left in the move source.

FIG. 13A and FIG. 13B are diagrams showing display examples of the recorded file menu shown in FIG. 10B2 and FIG. 10B4. FIG. 13A corresponding to FIG. 10B2 shows that only the reproducible contents are displayed, in which the reproducible contents are represented as "Reproduction OK" and the movable contents as "Move OK". In contrast, FIG. 13B corresponding to FIG. 10B4 shows that only the unreproducible contents of move with conversion are displayed, in which the unreproducible contents are represented as "Reproduction NG", and the content of move with conversion as "Moved". Note that when only a part of a content has been converted and moved, such a content is represented as "Reproduction Partly OK" and "Moved Partly", as displayed both in FIG. 13A and FIG. 13B.

FIGS. 14A and 14B are diagrams showing display examples when the contents are moved backwards. FIG. 14A corresponding to FIG. 10A2 shows that attribute information of all contents in the recording area 208 are displayed, and the user selects the fifth content and presses a backward move button to move the content backwards from the external recording medium 301 to the content management device 101. FIG. 14B shows that, as a result of the backward move, the displayed remarks of the fifth content are changed from "Reproduction NG" to "Reproduction OK" and "Moved" to "Move OK" representing that the content can be moved.

FIG. 15A and FIG. 15B are diagrams showing display examples when the contents are deleted. FIG. 15A corresponding to FIG. 10A2 shows that attribute information of all contents in the recording area 208 are displayed, and the user selects the first and third contents and presses a delete button. FIG. 15B shows that, as a result of the delete, the first and third contents in FIG. 15A are deleted so that they are not displayed on the menu.

FIG. 14A and FIG. 15A corresponding to FIG. 10A2 show the display examples in which the attribute information of all contents in the recording area 208 are displayed. However, it is preferable for the user to follow the steps displayed in FIGS. 10B2, 10B3, and 10B4 in order to correctly display and select the backward move button and the delete button for the contents that have been moved and disabled from being reproduced.

Figure 16:
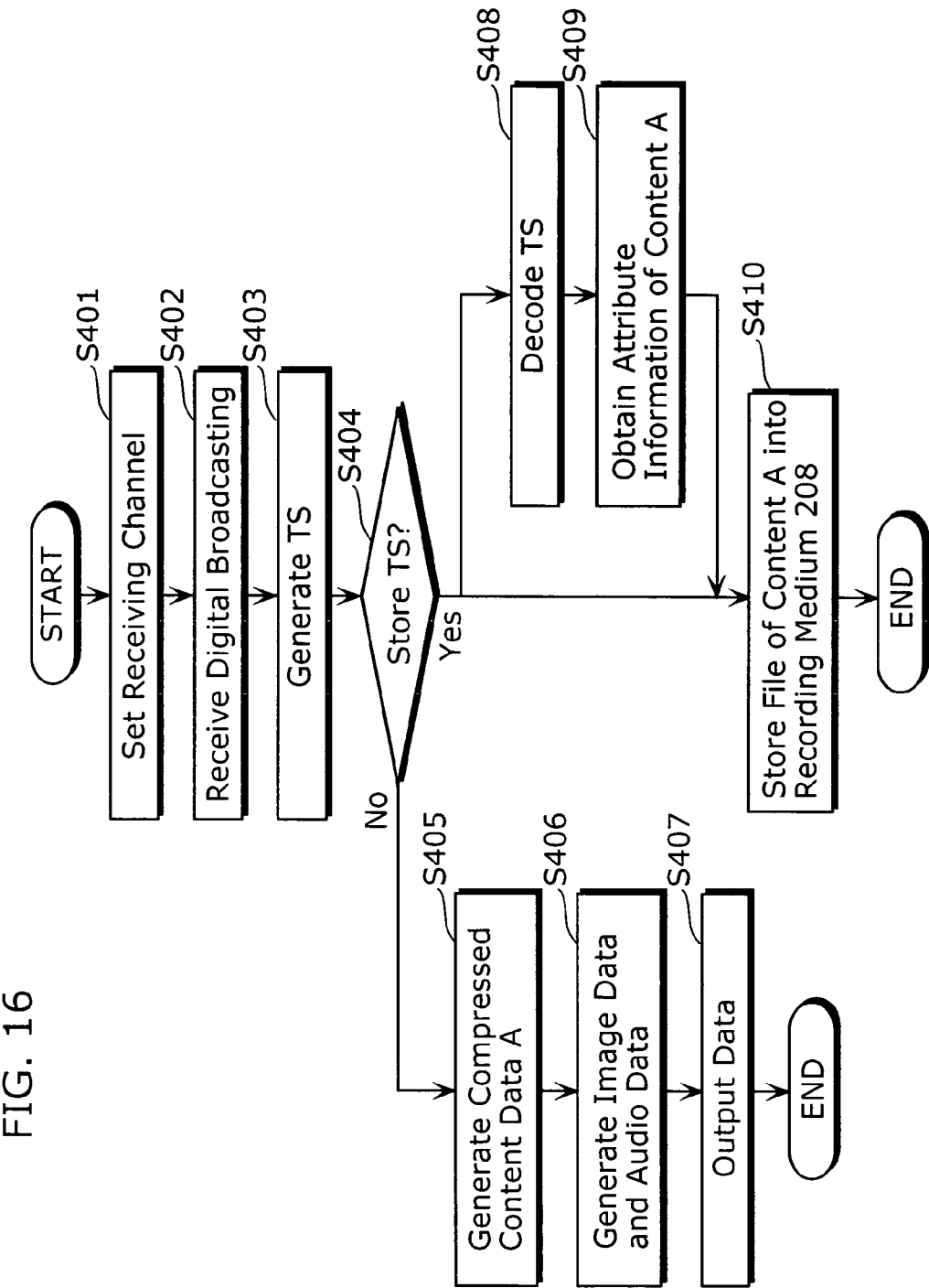
FIG. 16 is a flowchart showing each step by which the received digital broadcast signal is reproduced or stored in the recording area 208, according to the present embodiment.
Figure 17:
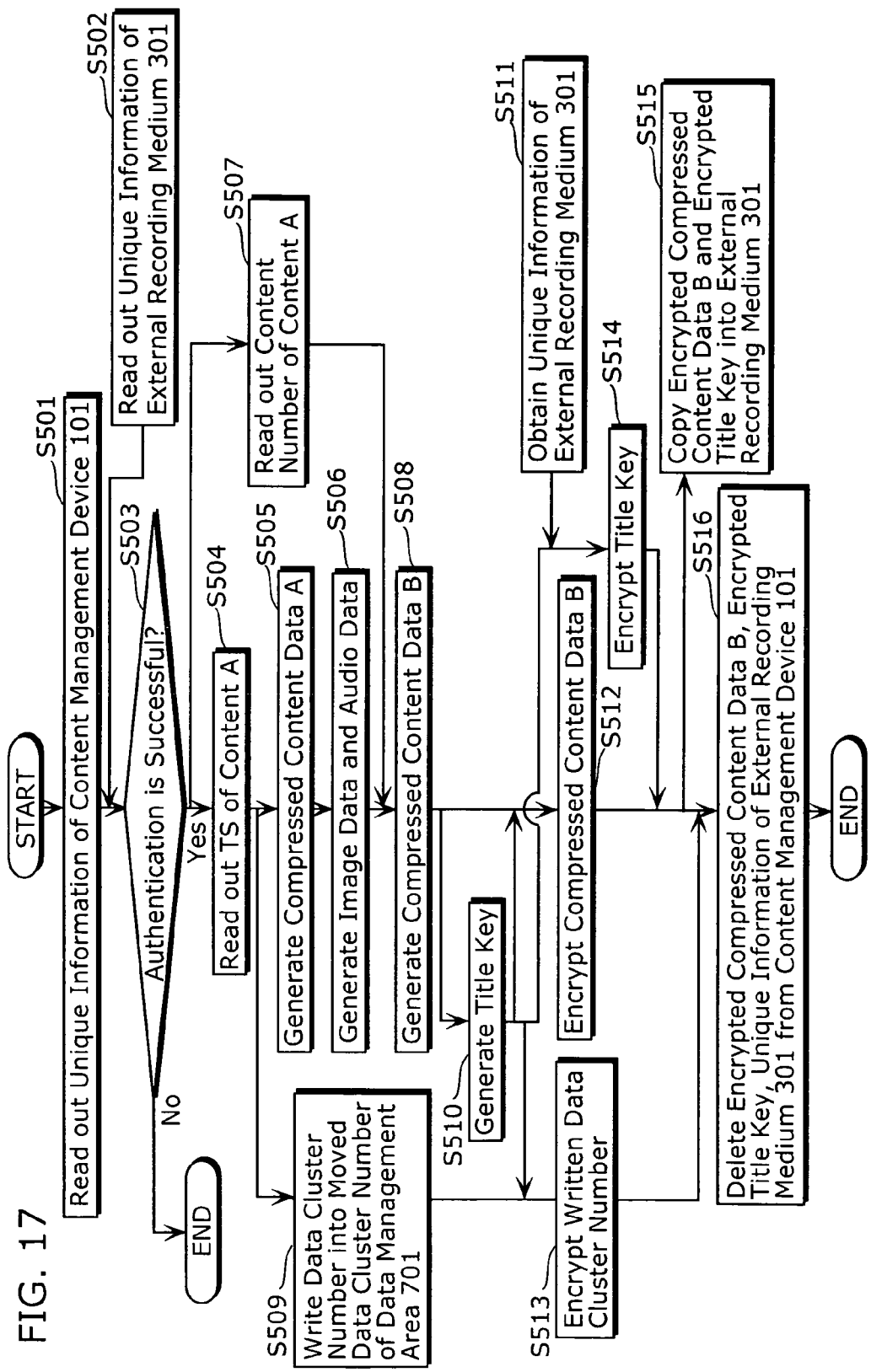
FIG. 17 is a flowchart showing each step by which a content A stored in the recording area 208 of the content management device 101 is converted and moved to the external recording medium 301 as a content B, according to the present embodiment.
Figure 18:
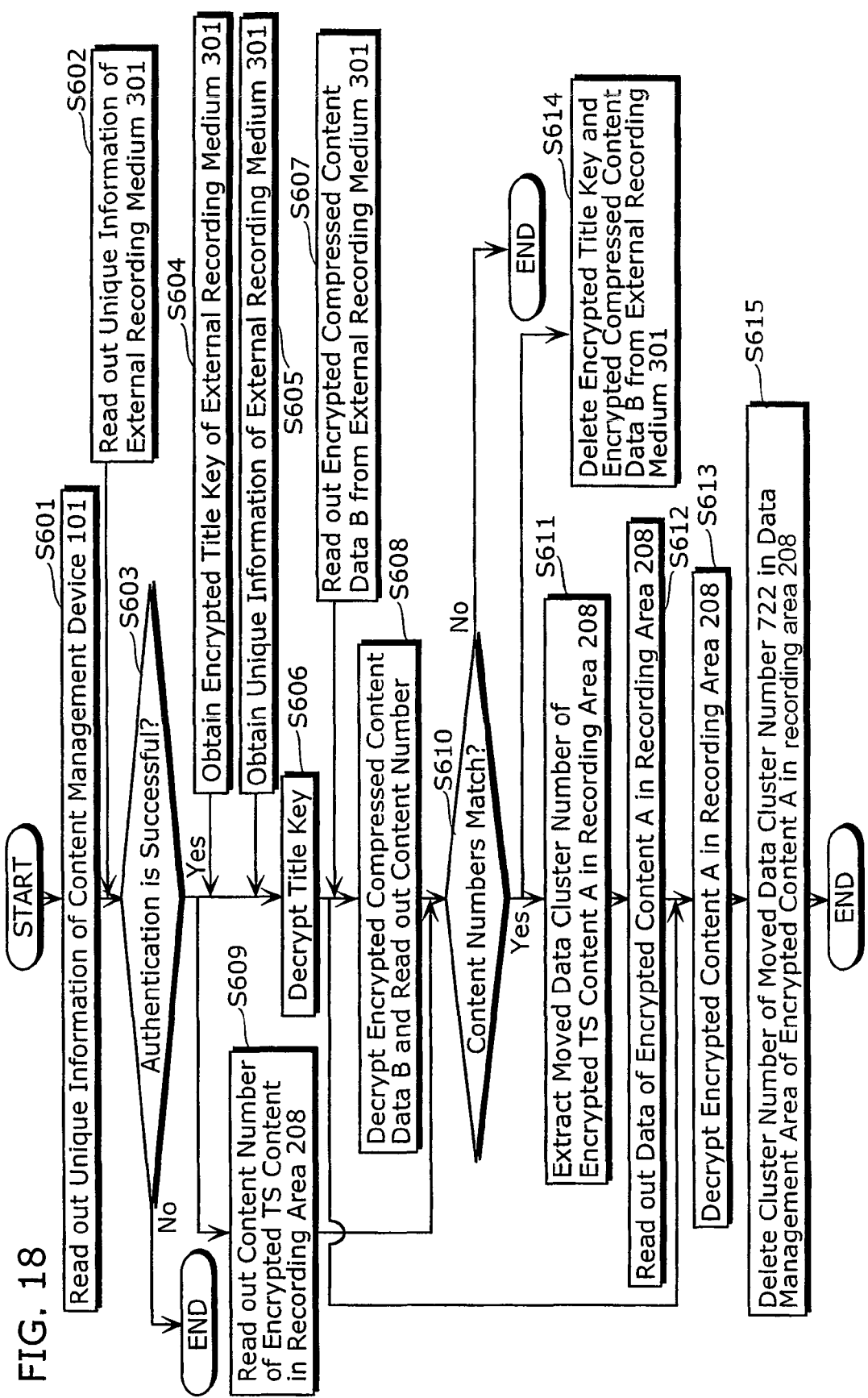
FIG. 18 is a flowchart showing each step by which the content B moved to the external recording medium 301 is moved backwards to the content management device 101 being the move source, and the content A is re-enabled to be reproduced, according to the present embodiment.

The following describes each step by which the content management device 101 and the external recording medium 301 according to the present embodiment record, move, and move backwards a copy-once content, with reference to FIG. 16 to FIG. 18.

FIG. 16 is a flowchart showing each step by which a digital broadcast signal received by the content management device 101 is play or recorded in the recording area 208.

Firstly, the user sets a broadcasting channel which the user wishes to watch, on the tuner 202 (S401). The antenna 201 receives digital broadcast signals (S402), and the demodulation unit 203 generates, from the broadcast signal, a TS regarding in the receiving channel that the user wishes to watch (S403). The TS decoder 204 descrambles the generated TS and decodes it with an error correcting code, and then determines whether the user wishes to record the TS regarding the receiving channel in the recording area 208 or to play the TS in real time (S404). Note that, in the above TS, compressed image data, compressed audio data, a transmission control signal, SI, and data for data broadcasting are multiplexed and have Packet IDs (PIDs) regarding the tuned specific channel (hereafter, referred to as "specific channel multiplexed TS").

If the user whishes to play the TS in real time (No at S404), then the TS decoder 204 separates the specific channel multiplexed TS, and forms compressed content data A that is made up of the PES of image data and audio data (S405). The formed compressed content data A is supplied to the compression/extension unit 205, and extended in the compression/extension unit 205 to generate image data and audio data (S406). The image data and audio data are supplied to the reproduction processing unit 206, and in the reproduction processing unit 206 the image data is converted into an image signal to be outputted to the display 215, while the audio data is converted into an audio signal to be outputted to the speaker 216 (S407).

On the other hand, if the user wishes to record the TS (Yes at S404), then the TS decoder 204 outputs the specific channel multiplexed TS to the recording area 208, and the recording area 208 stores the specific channel multiplexed TS in units of cluster in the data area 702 of the recording area 208 (S410). The specific channel multiplexed TS recorded in the data area 702 of the recording area 208 is hereafter referred to as "content A multiplexed TS".

Next, when the specific channel multiplexed TS is recorded into the recording area 208, the specific channel multiplexed TS is separated by the TS decoder 204 to be decoded into the PES of the compressed image data, the compressed audio data, the transmission control signal, the SI, and the data for data broadcasting (S408), and the decoded data are supplied to the content information extraction unit 211. The content information extraction unit 211 filters the SI and the transmission control signal from the supplied PES. The SI and the transmission control signal indicate program information and copy control information of the tuned content. The content information extraction unit 211 extracts a title, a genre, and image quality of the content from the SI, and extracts digital copy control information from the transmission control signal (S409). The above extracted program information and copy control information of the content are supplied to the data management area 701 in the recording area 208.

FIG. 17 is a flowchart showing each step by which a copy-once content recorded in the recording area 208 of the content management device 101, and converted into a low-quality content and moved to the external recording medium 301.

A copy-once content is converted and then moved to the external recording medium 301 at the following sequence of steps, and subsequently held in the content management device 101 is disabled from being reproduced.

Firstly, the content control unit 210 of the content management device 101 reads out the unique information of the content management device 101 from the ROM area 207 (S501). Next, the unique information of the external recording medium 301 is read out from the ROM area 305 in the external recording medium 301 (S502). Using the unique information of the content management device 101 and the external recording medium 301 that have been read out, authentication is made whether or not data can be securely transferred between the content management device 101 and the external recording medium 301 (S503).

If the authentication fails, then any contents cannot be moved and the processing is complete (No at S503). If the authentication is successful (Yes at S503), then by user's operation of the enter key 213, a content which the user wishes to move (assuming as a content A) is selected from the contents recorded in the recording area 208, and a content number of the selected content is read out from the content number 710 in the data management area 701 (S507). The content number that has been read out is supplied to the compression/extension unit 205.

Next, the content A multiplexed TS is read out from the data area 702 in the recording area 208 (S504), and supplied to the TS decoder 204. In addition, the cluster numbers of data of the content A that have been actually read out are written into the moved data cluster number 722 in the data management area 701 (S509).

Next, the compressed content data A, which is data of the PES of image data and audio data separated by the TS decoder 204, is formed (S505), and once extended in the compression/extension unit 205 to generate a baseband signal of image data and audio data (S506). The baseband image data and audio data is added with the above content number that has been read out from the recording area 208, and supplied to the compression/extension unit 205.

The compression/extension unit 205 further compresses the baseband image data and audio data to form compressed content data B that has lower definition and a lower encoding bit rate than those before being further compressed (S508). Note that, as described above, the compressed content data B is one example of a "copy" of the content A in the content management device according to the present invention.

Next, the content control unit 210 automatically generates a title key at random using information such as a title of the compressed content data B (S510). Further, the compressed content data B is encrypted using the title key, resulting in encrypted compressed content data B (S512). Still further, the content A multiplexed TS, which is designated by the cluster numbers that have been read out from the moved data cluster number 722 in the recording area 208, is encrypted using the same title key, resulting in an encrypted TS content A (S513).

Further, the unique information of the external recording medium 301 is further obtained from the ROM area 305 in the external recording medium 301 (S511). The title key generated in the content control unit 210 is encrypted using this obtained unique information (S514), resulting in an encrypted title key. The encrypted title key and the encrypted compressed content data B are copied to the external recording medium 301 (S515). Simultaneously in the content management device 101, the encrypted title key, the encrypted compressed content data B, and the obtained unique information of the external recording medium 301 are deleted (S516).

At the above steps, the encrypted TS content A recorded in the recording area 208 of the content management device 101 is disabled from being reproduced. This means that the user can not play the content A.

On the other hand, in the external recording medium 301, the encrypted title key copied to the external recording medium 301 can be decrypted using the unique information of the external recording medium 301, and the encrypted compressed content data B copied to the external recording medium 301 together with the encrypted title key can also be decrypted using the decrypted title key. This means that the user, using the external recording medium 301, can reproduce and play the low-quality content which is a copy of the content A but has different quality, using a device, except the content management device 101, that can reproduce the content As a result, the same situation as when the content has been moved from the content management device 101 to the external recording medium 301 is established.

FIG. 18 is a flowchart showing each step by which the low-quality content moved to the external recording medium 301 is moved backwards to the content management device 101.

At the following sequence of steps, the unreproducible content stored in the content management device 101 is re-enabled to be reproduced. Simultaneously, the content recorded in the external recording medium 301 is deleted.

Firstly, the content control unit 210 in the content management device 101 reads out the unique information of the content management device 101 from the ROM area 207 (S601), and then reads out the unique information from the ROM area 305 of the external recording medium 301 (S602). Using the unique information of the content management device 101 and the external recording medium 301 that have been read out, authentication is made whether or not data can be securely transferred between the content management device 101 and the external recording medium 301 (S603).

If the authentication fails, then any contents cannot be moved backwards and the processing is complete (No at S603). If the authentication is successful (Yes at S603), then the user operates the enter key 213 to select for a content which the user wishes to move backwards, from the contents that has been disabled from being reproduced after having been moved and recorded in the recording area 208, and then a content number of the selected content (assuming as a content A) is read out from the content number 710 in the data management area 701 (S609).

The content control unit 210 obtains the encrypted title key that has been moved to, from the recording area 304 in the external recording medium 301 (S604). Further, the unique information of the external recording medium 301 is obtained from the ROM area 305 in the external recording medium 301 (S605). Then, the obtained encrypted title key is decrypted using the unique information of the obtained external recording medium 301 (S606).

The content control unit 210 further reads out, from the recording area 304 in the external recording medium 301, the encrypted compressed content data B that has been moved to (S607). Note that the above encrypted compressed content data B has been formed by further converting and compressing the content A to be moved. Firstly, the encrypted compressed content data B that has been read out is decrypted using the above decrypted title key resulting in compressed content data B, and then decoded in the compression/extension unit 205 (hereafter, the decrypted compressed content data B is referred to as "content data B"). A content number added to the content data in the move is extracted from the content data B decoded in the compression/extension unit 205 (S608).

A determination is made whether or not the content number extracted from the content data B matches the content number that has been read out from the content number 710 in the data management area 701 of the recording area 208 (S610). As a result, if the content numbers do not match, then the processing for moving the content backwards is complete (No at S610). If they match (Yes at S610), then cluster numbers are extracted (S611). Note that the cluster numbers correspond to the data moved from the moved data cluster number 722 stored in the data management area 701. The moved data cluster number 722 corresponds to the content A that is stored in the recording area 208 and that is a content file having the matched content number.

The encrypted TS content A, which is a TS of the encrypted content data A that is substance data recorded in the data area 702, is read out using the extracted cluster numbers of the moved data cluster numbers (S612). The encrypted TS content A that has been read out is decrypted using decrypted title key (S613). Simultaneously in the external recording medium 301, the encrypted title key and the encrypted compressed content data B are deleted (S614). Then, the moved data cluster numbers of the moved data cluster number 722 of the content A in the data management area 701 of the recording area 208 are deleted (S615).

At the above steps, in other words, by moving backwards the low-quality content that has been moved to the external recording medium 301, it is possible in the content management device 101 to reproduce the high-quality content that is accumulated in the recording area 208 as unreproducible. On the other hand, the encrypted compressed content data B recorded in the external recording medium 301 is deleted so that the same situation as when the content has been moved from the external recording medium 301 to the content management device 101 is maintained.

As described above, the moved content is disabled from being reproduced in the content management device 101 so that the user can not play the content. However, as described with reference to FIG. 10A1 to FIG. 15C, the content management device 101 can output to and display on the display 215 the attribute information of the content that cannot be reproduced and played. Furthermore, using a display screen, the user can move the moved unreporducible content backwards and delete the unreporducible content.

Figure 19:
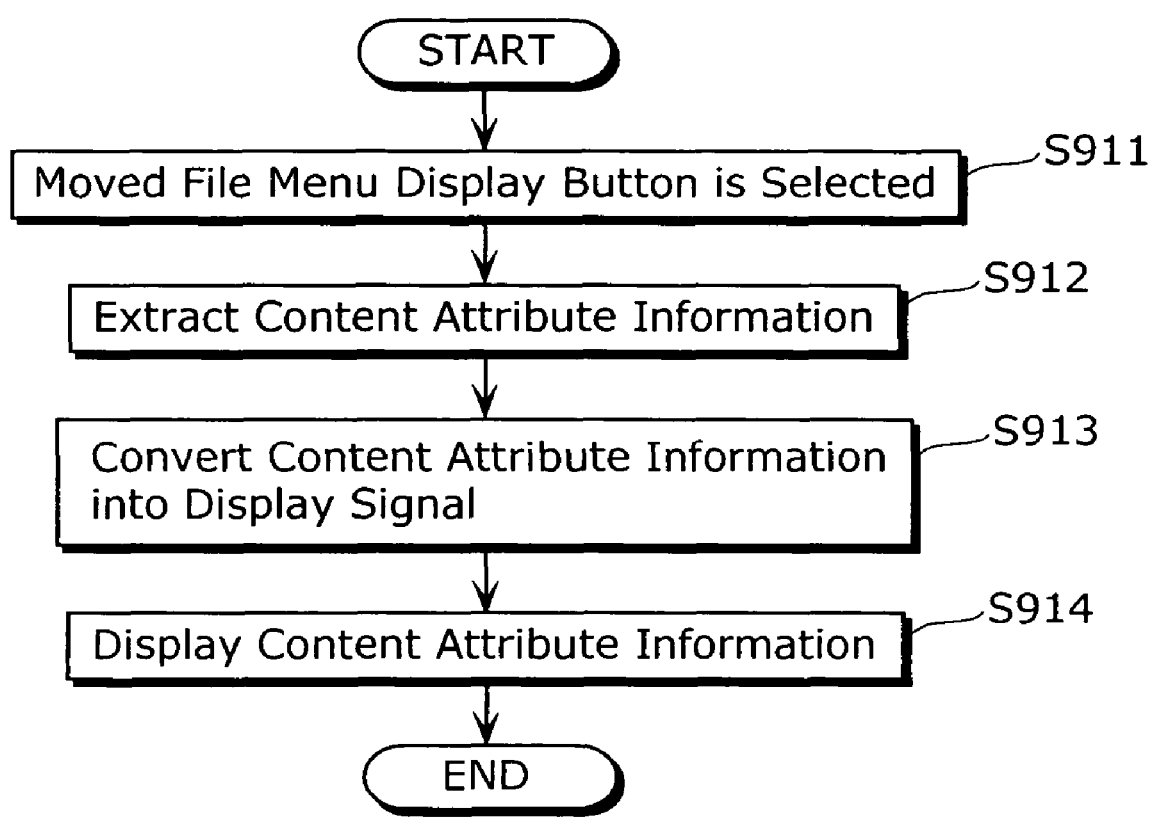
FIG. 19 is a flowchart showing each step by which the attribute information of the content recorded not to be reproduced after being moved is displayed in response to a request from the user, according to the present embodiment.
Figure 20:
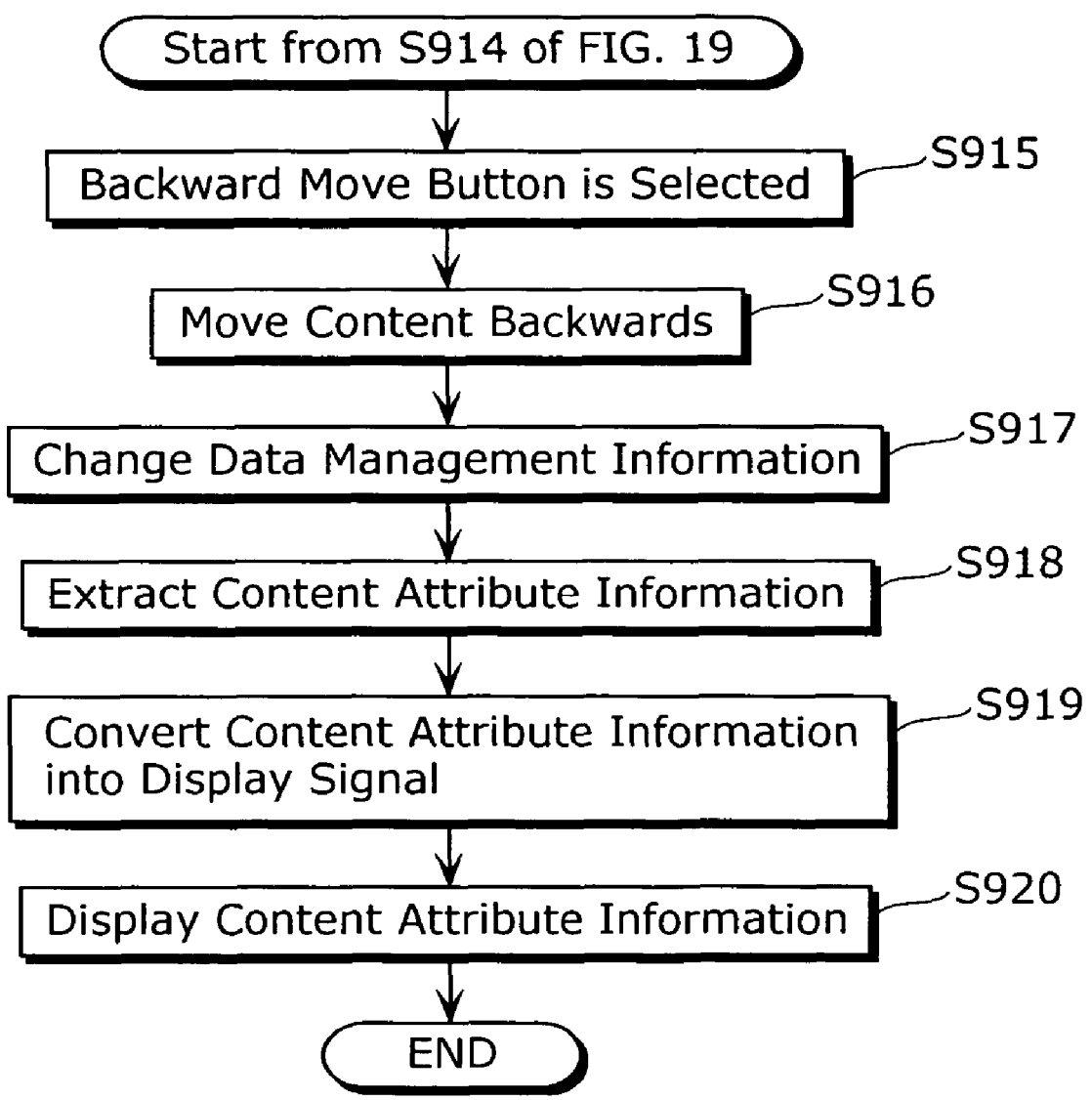
FIG. 20 is a flowchart showing each step by which the attribute information of the content recorded not to be reproduced after being moved is moved backwards to the move source in response to a request from the user, according to the present embodiment.
Figure 21:
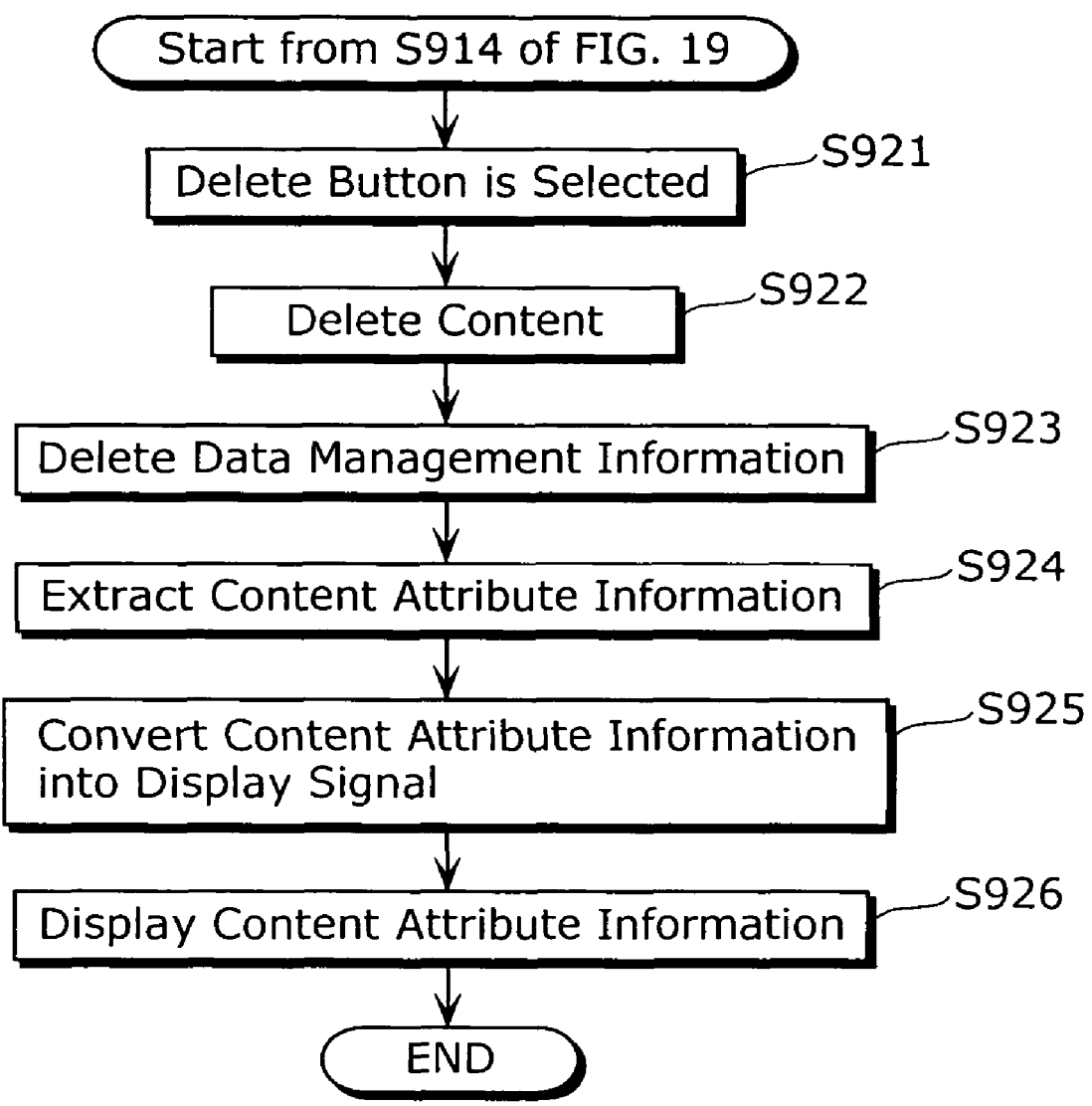
FIG. 21 is a flowchart showing each step by which the attribute information of the content recorded not to be reproduced after being moved is deleted in response to a request from the user, according to the present embodiment.

The following describes each step by which the content management device 101 according to the present embodiment outputs the attribute information of the unreproducible content, and moves backwards and deletes the unreproducible content with reference to FIG. 19 to FIG. 21.

FIG. 19 is a flowchart showing each step performed by the content management device 101 when attribute information of a content that has been disabled from being reproduced and recorded after having been moved is outputted in response to a request from the user, and displayed on the display 215.

The content information extraction unit 211, by user's operation of the enter key 213, for example, by user's selecting the moved file menu display button in FIG. 10B3 (S911), extracts content attribute information from the data management area 701 in the recording area 208 (S912). The extracted content attribute information are supplied to the content information output unit 212.

In the content information output unit 212, the content attribute information received from the content information extraction unit 211 are converted into signals to be displayed on the display 215 (S913). The converted signals are outputted to the display 215 to be displayed (S914).

Note that when the content information extraction unit 211 extracts the content attribute information from the data management area 701 in the recording area 208 (S912), it is possible to classify kinds of contents whose the attribute information to be displayed, by checking the indication of the reproduction 718 of the file attribute 800 (shown in FIG. 5B). Thereby, it is possible to display the attribute information of all contents (shown in FIG. 11, for example), of only the reproducible contents (shown in FIG. 13A, for example), or of only the unreproducible contents (shown in FIG. 13B, for example).

FIG. 20 is a flowchart showing each step performed by the content management device 101 when a content that has been disabled from being reproduced and recorded after having been moved is moved backwards to the move source in response to a request from the user.

The content control unit 210 moves the content backwards to the move source, by user's operation of the enter key 213, for example, by user's selecting a backward move button in FIG. 10B4 (S915), based on the content attribute information (FIG. 14A, for example) displayed on the display 215 at S914 of FIG. 19 (S916). After the content is moved backwards, the content information output unit 212 changes data management information of the content that has been moved backwards (S917). More specifically, the reproduction 718 of the file attribute 800 is changed from "Reproduction NG" to "Reproduction OK", and the move 720 is changed from "Moved" to "Move OK".

The content information output extraction unit 211 extracts the changed content attribute information (S918). The extracted content attribute information are supplied to the content information output unit 212. In the content information output unit 212, the content attribute information received from the content information extraction unit 211 are converted into signals to be displayed on the display 215 (S919). Then, the converted signals are outputted to the display 215 to be displayed (S920).

At the above steps, the displays on the display 215 are changed, for example, from the displayed content attribute information before the content is moved backwards shown in FIG. 14A to the displayed content attribute information after the content is moved backwards shown in FIG. 14B.

FIG. 21 is a flowchart showing each step by which a content that has been disabled from being reproduced and recorded after having been moved is deleted in response to a request from the user.

The content deletion unit 214 deletes a content that has been moved and disabled from being reproduced, by user's operation of the enter key 213, for example, by user's selecting an delete button shown in FIG. 10B4 (S921), based on the content attribute information (FIG. 15A, for example) displayed on the display 215 at S914 of FIG. 19 (S922). After the content is deleted, the content information output unit 212 deletes the data management information of the deleted content (S923). The content information extraction unit 211 extracts again the content attribute information in the data management area 701 (S924). The extracted content attribute information is supplied to the content information output unit 212. In the content information output unit 212, the content attribute information received from the content information extraction unit 211 are converted into signals to be displayed on the display 215 (S925). Then, the converted signals are outputted to the display 215 to be displayed (S926).

In the above processing, the displays on the display 215 are changed, for example, from the displayed content attribute information before the content is deleted shown in FIG. 15A to the displayed content attribute information after the content is deleted shown in FIG. 15B.

As described above, the content management device 101 according to the present embodiment stores the content A into the recording area 208. During storing the content A, the content management device 101 can obtain the attribute information of the content A, and records it as the management information into the data management area 701 of the recording area 208.

Furthermore, a copy of the content A is compressed and converted into a content having low definition and a low encoding bit rate by the compression/extension unit 205, generating in a content B. The content B is encrypted and outputted to the external recording medium 301.

Here, in the content management device 101, the content A is encrypted using the title key as an encryption key, and the title key is encrypted using the unique information of the external recording medium 301. The encrypted title key is outputted to the external recording medium 301 together with the encrypted content B, and after being outputted, the encrypted content B, the encrypted title key, and the unique information which exist in the content management device 101 are deleted.

This means that the copy of the content A is compressed and converted into the content B in the content management device 101, and outputted to the external recording medium 301. The content B is recorded in the external recording medium 301, and in the content management device 101 the content A being an original content of the content B is encrypted and disabled from being reproduced. As a result, the content B, which is a copy of the content A but has different quality, is recorded in the external recording medium 301 to be reproduced, and the content A is held in the content management device and cannot be reproduced. This means that the same situation as when the content has been moved from the content management device 101 to the external recording medium 301 is established.

However, the attribute information of the content A is recorded in the content management device 101 so that it is possible to output the attribute information to the display 215. That is, the content management device 101 can notify the user of the attribute information of the unreproducible content A so that the user can recognize a title, a recording size, and the like of the unreproducible content A. Furthermore, the user can delete the content A when the content A becomes no longer necessary.

Further, the content management device 101 obtains the unique information, the content B, and the encrypted title key from the external recording medium 301. Thereby, the content management device 101 can specify the content A and to decrypt the encrypted title key. Furthermore, this enables to decrypt the encrypted content A using the above title key so that the user can reproduce the content A. This means that the user can play the content A with the same quality as that before the content A being compressed and converted to be moved.

Note that the content management device 101 may not include the recording area 208. For example, the content management device 101 may be connected with the external recording device via a predetermined unit in order to record a content and content attribute information. This enables to easily increase a recording capacity for the content management device 101, for example, by replacing the external recording device with another one having a larger recording capacity in order to record more contents.

Further, the present embodiment has described that the content attribute information are displayed on the display 215 in order to notify the user of the attribute information of the unreproducible contents, but it should be appreciated that the unit for notifying the attribute information is not be limited to the display 215. For example, it is possible to output the attribute information as a sound by the speaker 216, or as a print by a printer connected to the content management device 101.

This enables to notify in the various ways the user of the attribute information of the unreproducible content.

Note that some or all of the tuner 202, the demodulation unit 203, the TS decoder 204, the compression/extension unit 205, the recording area 208, the reproduction processing unit 206, the ROM area 207, the communication processing unit 209, the content control unit 210, the content information extraction unit 211, and the content information output unit 212, which are included in the content management device 101 according to the present invention, may be implemented into a single integrated circuit (integrated chip).

Although only the exemplary embodiment according to the present invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The content management device and the content management method according to the present invention is useful, for example, for a device and a method for receiving and recording digital image and audio data whose copyright is protected by digital television broadcasting, for transferring the digital image and audio data to an external recording medium, and for reproducing and accumulating the digital image and audio data into a reproduction device.

What is claimed is:

1. A content management device for managing transfer of a content in digital format, the device comprising:
communication circuitry configured to output a second content in digital format so as to record the second content on a second recording medium that is an external recording medium, while a first content in digital format is kept in a first recording medium, the second content in digital format being generated from at least part of the first content recorded on the first recording medium, and the second content having quality lower than quality of the first content; and
content control circuitry configured to, when the second content is outputted to the second recording medium, (i) maintain specification information and the first content in association with each other on the first recording medium, the specification information being used for specifying the at least part of the first content data which is used in generating the second content, and (ii) disable playback of the at least part of the first content which is specified by specification information.

2. The content management device according to claim 1, wherein said content control circuitry is configured to enable the playback of the at least part of the first content that is still recorded on the first recording medium and is specified by the specification information, when said communication circuitry recognizes the second content recorded on the second recording medium, after said communication circuitry outputs the second content to be recorded onto the second recording medium and said content control circuitry disables the playback of the at least part of the first content which is specified by the specification information.

3. The content management device according to claim 2, wherein said communication circuitry is further configured to generate an instruction to delete the second content from the second recording medium, when said content control circuitry enables the playback of the at least part of the first content which is specified by the specification information.

4. The content management device according to claim 3, further comprising
deletion circuitry configured to delete the second content from the second recording medium according to the instruction generated by said communication circuitry.

5. The content management device according to claim 3, wherein said communication circuitry is further configured to issue the instruction to an external device so as to cause the external device to delete the second content from the second recording medium, the external device being capable of accessing the second recording medium.

6. A content management method for managing a content transfer of a content in digital format, the method comprising:
recording a first content in digital format on a first recording medium;
outputting a second content in digital format so as to record the second content on an second recording medium that is an external medium, while the first content in digital format is kept in the first recording medium, the second content in digital format being generated from at least part of the first content recorded on the first recording medium, and the second content having quality lower than quality of the first content; and
when the second content is out putted to the second recoding medium, (i) maintaining specification information and the first content in association with each other on the first recording medium, the specification information being used for specifying the at least part of the first content data which is used in generating the second content, and (ii) disabling playback of the at least part of the first content which is specified by specification information.

7. A non-transitory computer readable medium containing a program for managing transfer of a content in digital format, the program causing a computer to execute:
recording a first content in digital format on a first recording medium;
outputting a second content in a digital format so as to record the second content to on an second recording medium that is an external medium, while the first content in digital format is kept in the first recording medium, the second content in digital format being generated from at least part of the first content recorded on the first recording medium, and the second content having quality lower than quality of the first content; and when the second content is out putted to the second recoding medium, (i) maintaining specification information and the first content in association with each other on the first recording medium, the specification information being used for specifying the at least part of the first content data which is used in generating the second content, and (ii) disabling playback of the at least part of the first content which is specified by specification information.

* * * * *

UNITED STATES PATENT AND TRADEMARK OFFICE
CERTIFICATE OF CORRECTION

| | | |
|---|---|---|
| PATENT NO. | : 8,249,428 B2 | |
| APPLICATION NO. | : 11/223034 | |
| DATED | : August 21, 2012 | |
| INVENTOR(S) | : Katsuo Saigo et al. | |

It is certified that error appears in the above-identified patent and that said Letters Patent is hereby corrected as shown below:

In the Claims:

At column 26, claim number 6, line number 38, the words "a content" should be deleted.

Claim number 6, lines 38-39 should read:

6. A content management method for managing ~~a content~~ transfer of a content in digital format, the method comprising:

Signed and Sealed this
Fourteenth Day of May, 2013

Teresa Stanek Rea
*Acting Director of the United States Patent and Trademark Office*